US012660915B2

(12) United States Patent
Fadhli et al.

(10) Patent No.: US 12,660,915 B2
(45) Date of Patent: Jun. 23, 2026

(54) DESK FOR INDUSTRIAL DESIGNERS

(71) Applicant: Imam Abdulrahman Bin Faisal University, Dammam (SA)

(72) Inventors: Lamis Ali Yahya Fadhli, Dammam (SA); Hala El-Wakeel, Dammam (SA); Lojain Alamri, Dammam (SA); Ruba Alkhaldi, Dammam (SA); Noran Kattan, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 179 days.

(21) Appl. No.: 18/787,338

(22) Filed: Jul. 29, 2024

(65) Prior Publication Data

US 2025/0344847 A1 Nov. 13, 2025

Related U.S. Application Data

(60) Provisional application No. 63/644,783, filed on May 9, 2024.

(51) Int. Cl.

| | |
|---|---|
| ***A47B 27/02*** | (2006.01) |
| ***F21V 33/00*** | (2006.01) |
| *A47B 21/03* | (2006.01) |

(52) U.S. Cl.

CPC .......... *A47B 27/02* (2013.01); *F21V 33/0012* (2013.01); *A47B 21/03* (2013.01)

(58) Field of Classification Search

CPC ......... A47B 27/02; A47B 21/03; A47B 21/00; F21V 33/0012; F21V 14/08

(Continued)

(56) References Cited

U.S. PATENT DOCUMENTS

| | | | | |
|---|---|---|---|---|
| 420,321 | A * | 1/1890 | Waring | |
| 1,780,287 | A * | 11/1930 | Wheeler ................ | A47B 17/04 312/211 |

(Continued)

FOREIGN PATENT DOCUMENTS

| | | | |
|---|---|---|---|
| CN | 218008694 U | | 12/2022 |
| CN | 219877693 U | * | 10/2023 |

(Continued)

OTHER PUBLICATIONS

Robin Grasby, "Homework Desk Can be Customized to Workspace Needs", Doorknob, Feb. 14, 2013. pp. 1-5.

(Continued)

*Primary Examiner* — Janet M Wilkens

(74) *Attorney, Agent, or Firm* — Oblon, McClelland, Maier & Neustadt, L.L.P.

(57) ABSTRACT

An adaptable workdesk having a work surface with a top side, a bottom side, a front edge, a rear edge, a left edge, a right edge. The adaptable workdesk includes an inset section for a cutting mat, a flat work section, a tool holder in a first recess, a roller in a second recess, and a moveable light in a third recess, on the top side. A flattened U-shaped light bar with rotatable ends attaches to the left and right edges via rotation mechanisms, allowing selectable angles. The adaptable workdesk also includes a U-shaped leg on the left edge, and a support leg and a slidable support wall on the right edge. The support wall moves between stowed and deployed positions. A side table rotatably and detachably connects to the support wall. The adaptable workdesk provides versatility for various tasks in industrial design and related professions.

20 Claims, 14 Drawing Sheets

(58) Field of Classification Search

USPC .......................... 108/50.11, 50.01, 50.02, 23; 312/194–196, 223.3, 205, 210, 237, 282, 312/351.4, 223.5, 305; 362/127, 576, 33

See application file for complete search history.

(56) References Cited

U.S. PATENT DOCUMENTS

| | | | | | |
|---|---|---|---|---|---|
| 2,558,204 | A * | 6/1951 | Wilson | A23D 7/02 | 99/455 |
| 2,829,935 | A * | 4/1958 | Raoul | A47B 17/02 | 108/30 |
| 3,558,204 | A * | 1/1971 | Elliot | A47B 21/00 | 312/282 |
| 4,740,044 | A | 4/1988 | Taylor | | |
| 5,057,978 | A * | 10/1991 | Conti | F21V 21/13 | 362/240 |
| 6,895,869 | B2 | 5/2005 | Lai | | |
| 7,159,629 | B1 * | 1/2007 | Rowe | B23D 47/025 | 144/286.5 |
| 8,327,774 | B1 * | 12/2012 | Rivera | B60N 3/005 | 108/50.02 |
| 10,477,960 | B1 * | 11/2019 | Johnson | A47B 5/02 | |
| 10,492,601 | B2 | 12/2019 | Mirth et al. | | |
| 2002/0040667 | A1 * | 4/2002 | Birsel | A47B 21/00 | 108/25 |
| 2002/0129746 | A1 | 9/2002 | Donnelly | | |
| 2006/0037873 | A1 * | 2/2006 | Elgart | A45C 9/00 | 190/11 |
| 2012/0020112 | A1 * | 1/2012 | Fisher | G02B 6/0096 | 362/127 |
| 2015/0182038 | A1 * | 7/2015 | Wiemer | F21V 23/001 | 362/225 |

FOREIGN PATENT DOCUMENTS

| | | | | |
|---|---|---|---|---|
| DE | 4115151 | A1 * | 11/1992 | A47B 21/0314 |
| GB | 2184649 | A * | 7/1987 | F21S 8/00 |

OTHER PUBLICATIONS

"Cubiker Computer Desk, Home Office Writing Study Desk, Modern Simple Style Laptop Table with Storage Bag (32 inch, Deep Brown)", Cubiker, Feb. 8, 2023, pp. 1, 2, 4, 5.

* cited by examiner

DESK FOR INDUSTRIAL DESIGNERS

CROSS REFERENCE TO RELATED APPLICATIONS

The present application claims the benefit of priority to U.S. Provisional Application No. 63/644,783, entitled "Desk For Industrial Designers And Designers' Homes", filed on May 9, 2024, and incorporated herein by reference in its entirety.

BACKGROUND

Technical Field

The present disclosure is directed to workspace furniture, and more particularly, to an adaptable workdesk for industrial designers and related professions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Workdesks and workstations are commonly used in various professions, including industrial design, engineering, architecture, and others that involve design and creative work. However, traditional workdesks are often limited in their functionality and adaptability, which can hinder the efficiency and productivity of professionals who require a versatile workspace. Industrial designers, in particular, have unique requirements when it comes to their workstations. They often need to work on multiple projects simultaneously, involving tasks such as sketching, prototyping, and computer-aided design (CAD). Additionally, they may need to collaborate with others, conduct research, and present their work effectively.

Conventional workdesks may lack the necessary features and flexibility to accommodate the diverse needs of industrial designers. For instance, they may not provide adequate lighting options, lack specialized workspaces for different tasks, or offer limited storage and organization solutions for tools and materials. Further, traditional workdesks often fail to adapt to the changing needs and work styles of designers, who may need to switch between various tasks or work environments throughout the day or project cycle. Furthermore, with the rising trend of home offices and compact living spaces, there is a growing demand for multifunctional furniture that not only saves space but also enhances functionality without compromising on design aesthetics.

US20020129746A1 describes a table with a recessed storage area and additional work surfaces and storage pouches. A plastic tray is provided as an insert in the work surface. The pouch hangs from one of the side surfaces and can be canvas, fabric, etc. An attached side table is shown. However, this reference does not include retractable built-in tool holder having divided compartments, an adjustable light bar, a photography backdrop, or a side table which can be drawn forward from the table and have legs or can be detached and carried elsewhere.

CN218008694U describes an intelligent sensing lifting desk which includes an induction light frame in a recessed back area and can be lifted by remote control. The lamp automatically senses ambient light and is self-adjusting. However, this reference does not include the features of a retractable built-in tool holder having divided compartments, a cutting board, a photography backdrop, or a side table which can be drawn forward from the table and have legs or can be detached and carried elsewhere.

Each of the aforementioned references suffers from one or more drawbacks hindering their adoption, such as lack of versatility, limited functionality, and failure to address the specific needs of industrial designers and related professionals. These references do not provide a comprehensive and adaptable workspace that can accommodate various tasks, such as sketching, prototyping, computer-aided design (CAD), and product photography. Accordingly, it is one object of the present disclosure to provide an adaptable workdesk that overcomes the limitations of the prior art by offering a versatile and functional workspace tailored to the unique requirements of industrial designers and related professions. The adaptable workdesk incorporates a combination of specialized features and components that facilitate efficient workflow across various design tasks.

SUMMARY

In an exemplary embodiment, an adaptable workdesk is described. The adaptable workdesk comprises a work surface having a top side and a bottom side, a front edge, a rear edge, a left edge, a right edge, a first axis which extends from the rear edge to the front edge and bisects the top side and a second axis which extends from the left edge to the right edge is located about one third of a distance between the rear edge and the front edge. The adaptable workdesk further comprises an inset section located on the top side between the first axis and the right edge near the front edge and between the second axis and the front edge. The inset section is configured to receive a cutting mat. The adaptable workdesk further comprises a flat work section located on the top side between the left edge and the first axis and between the second axis and the front edge. The adaptable workdesk further comprises a tool holder located within a first recess on the top side between the rear edge and the second axis and between the left edge and the right edge. The adaptable workdesk further comprises a light bar having a flattened U-shape, wherein the light bar has a left end and a right end. Each of the left end and the right end are rotatably attached to the left edge and the right edge respectively by a rotation mechanism. The rotation mechanism is configured to rotate the light bar at selectable angles with respect to the top side. The adaptable workdesk further comprises a second recess located in the top side between the rear edge and the tool holder. The second recess is configured to hold a roller connected between the left edge and the right edge. The adaptable workdesk further comprises a moveable light. The adaptable workdesk further comprises a U-shaped leg having a first leg attached to the left edge near the front edge and a second leg attached to the left edge near the rear edge. The adaptable workdesk further comprises a support leg attached to the right edge near the rear edge. The adaptable workdesk further comprises a support wall slidably attached to the right edge between the support leg and the front edge. The support wall is configured to slide between a stowed position in which a front edge of the support wall is flush with the front edge of the work table and a deployed position in which the front edge of the support wall extends outwardly from the front edge. The adaptable workdesk further comprises a side table rotatably and detachably connected to the support wall.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
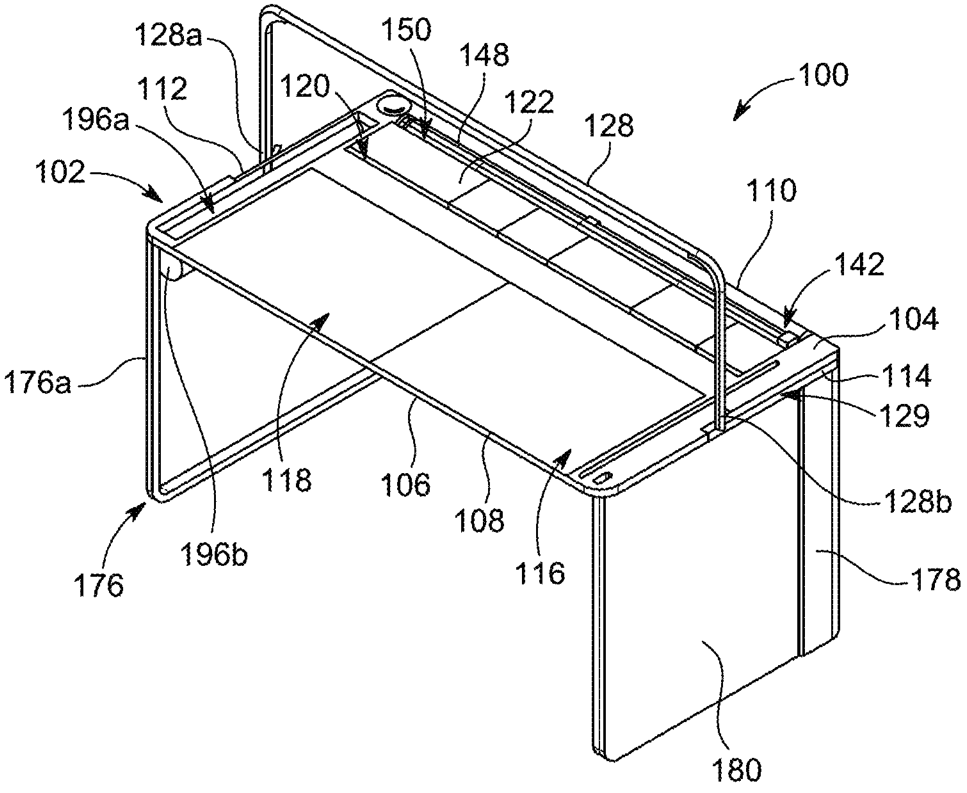
FIG. 1A is a right-side top perspective diagram of an adaptable workdesk, according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of this disclosure are directed to an adaptable workdesk designed to optimize workspace efficiency, adapt to various user requirements, and improve overall workflow. The adaptable workdesk is structured to provide a comprehensive solution that meets the needs of users engaged in a diverse range of activities, from routine office tasks to specialized creative work. The adaptable workdesk provides an integrated approach to enhance the functionality and ergonomics of the workspace and maximize the effective use of space. The adaptable workdesk incorporates features that are customizable and scalable according to the user’s immediate needs, so that it may be reconfigured for different tasks without compromising on comfort or accessibility.

Figure 1B:
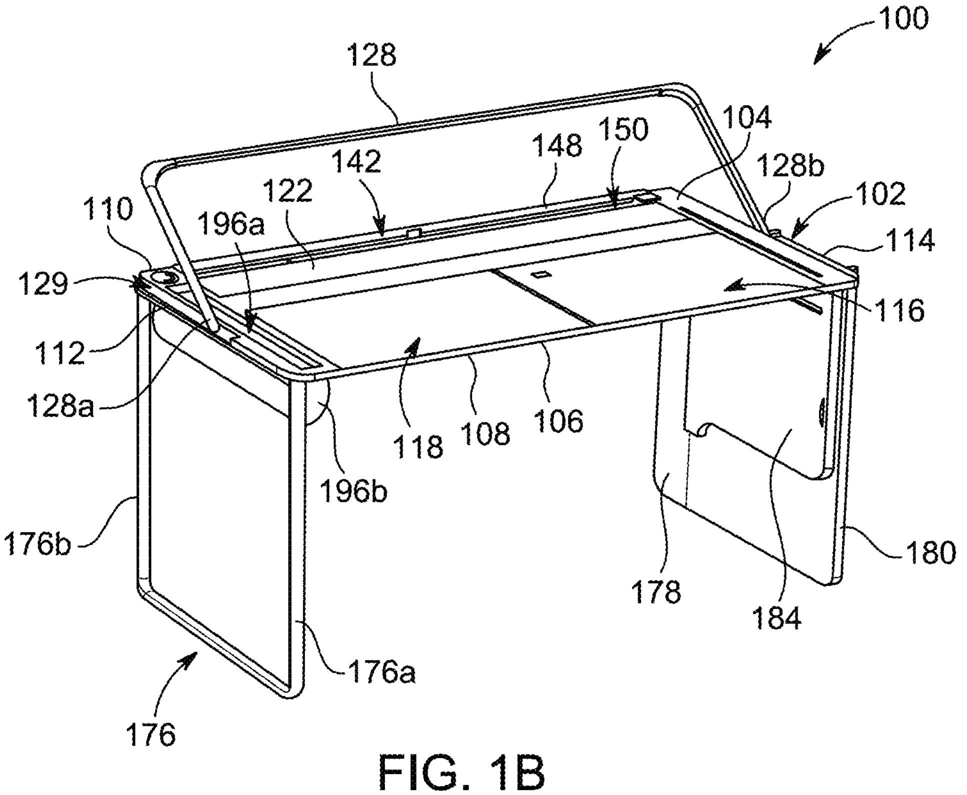
FIG. 1B is a left-side top perspective diagram of the adaptable workdesk, according to certain embodiments.

Referring to FIGS. 1A-1B in combination, illustrated are perspective views of an adaptable workdesk 100. As shown, the adaptable workdesk 100 includes a work surface 102. The work surface 102 is characterized by a top side 104 and a bottom side 106. Also, the work surface 102 is delineated by a front edge 108, a rear edge 110, a left edge 112, and a right edge 114. These boundaries define the overall dimensions and the usable area of the work surface 102.

Figure 2:
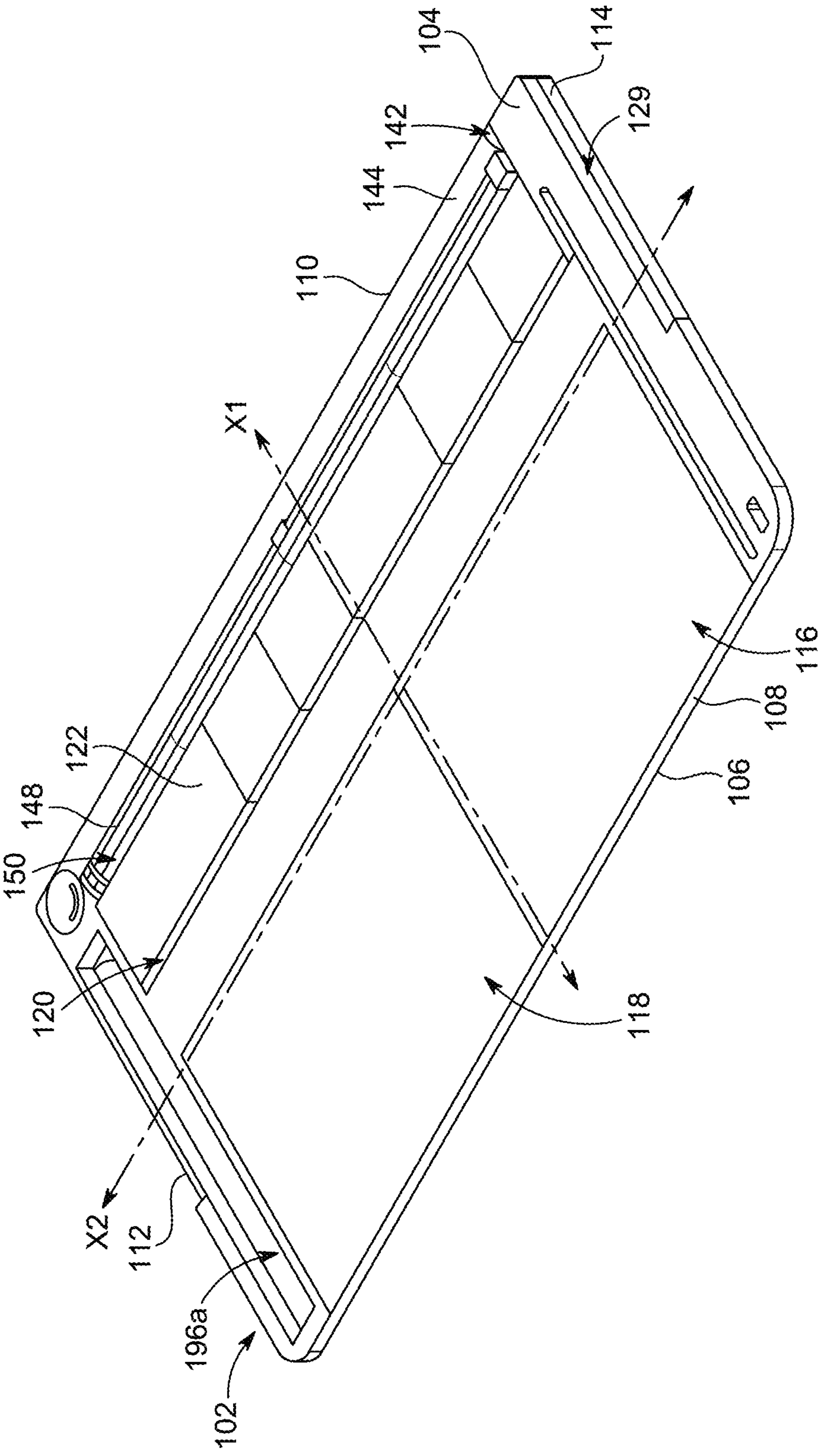
FIG. 2 is a perspective diagram of a work surface of the adaptable workdesk, according to certain embodiments.

FIG. 2 illustrates a planar view of the top side 104 of the work surface 102. As shown, a first axis ‘X1’ is defined which extends from the rear edge 110 to the front edge 108 and bisects the top side 104. A second axis ‘X2’ is defined which extends from the left edge 112 to the right edge 114. The second axis ‘X2’ is located about one third of a distance between the rear edge 110 and the front edge 108. This specific placement of the second axis ‘X2’ is defined as an aid in describing the functional zoning on the top side 104 of the work surface 102.

The work surface 102 is divided into distinct areas for specific tasks, thereby increasing efficiency and usability. In particular, herein, the geometrically defined areas on the work surface 102, structured around the axes 'X1' and 'X2', provide a framework for the layout of other components and features of the adaptable workdesk 100. This structured approach aids in the efficient use of space and enhances the ergonomics of the workspace, allowing users to position themselves and their tools in a manner that maximizes productivity and reduces physical strain during prolonged periods of use. Such geometrically optimized design of the work surface 102 aligns with the objectives of the adaptable workdesk 100 to serve the diverse and dynamic needs of its users.

The adaptable workdesk 100 includes an inset section 116 located on the top side 104 between the first axis 'X1' and the right edge 114 near the front edge 108, and between the second axis 'X2' and the front edge 108. The inset section 116 is specifically configured to receive a cutting mat (not shown). The placement of the inset section 116 in this location maximizes functionality and accessibility, ensuring that it is within easy reach of the user while working on the adaptable workdesk 100. The cutting mat, when placed within the inset section 116, provides a designated surface for cutting and trimming materials, a common task in industrial design and related professions. The recessed nature of the inset section 116 helps to prevent the cutting mat from sliding or shifting during use, ensuring a stable and secure workspace for precision cutting operations. Additionally, the inset design helps to contain any debris or material scraps resulting from the cutting process, keeping the rest of the work surface 102 clean and organized.

The adaptable workdesk 100 also includes a flat work section 118 located on the top side 104 between the left edge 112 and the first axis 'X1', and between the second axis 'X2' and the front edge 108. The placement of the flat work section 118 on the top side 104, defined by the boundaries of the left edge 112, the first axis 'X1', the second axis 'X2', and the front edge 108, ensures that it is conveniently accessible and within the primary working area of the user. In an example, the flat work section 118 is a dedicated workspace designed for tasks such as sketching, drafting, or working with physical prototypes. The flat surface of the flat work section 118 provides an optimal area for creating sketches, drawings, or working on small-scale prototypes with ease. The user can comfortably position themselves in front of the flat work section 118 and utilize it as a primary workspace for various design-related activities that require a stable and flat surface.

Referring again to FIGS. 1A-1B and 2, as illustrated, the adaptable workdesk 100 incorporates a first recess 120 on the top side 104. The first recess 120 is disposed between the rear edge 110 and the second axis 'X2', and between the left edge 112 and the right edge 114. The first recess 120 spans the entire distance between the left edge 112 and the right edge 114. The adaptable workdesk 100 further includes a tool holder 122 located within the first recess 120. Such positioning of the tool holder 122 within the first recess 120 at the back portion of the work surface 102 utilizes the underused space in conventional desks and ensures that tools and supplies are easily accessible while not interfering with the primary working area. The first recess 120 allows the tool holder 122 to be inset into the work surface 102, helping to maintain a clear and uncluttered workspace. This contributes to the overall aesthetics of the adaptable workdesk 100 by minimizing visual clutter, thereby maintaining a clean and professional appearance.

Figure 3A:
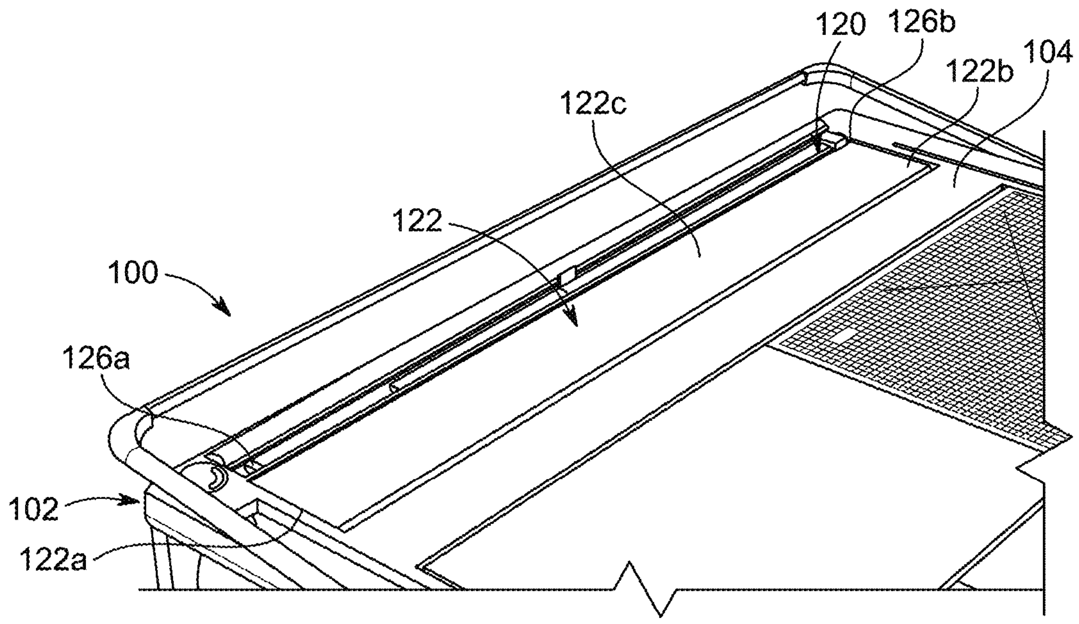
FIG. 3A is a partial perspective diagram of the adaptable workdesk showing a tool holder, located towards a read edge of the work surface therein, in a closed position thereof, according to certain embodiments.
Figure 3B:
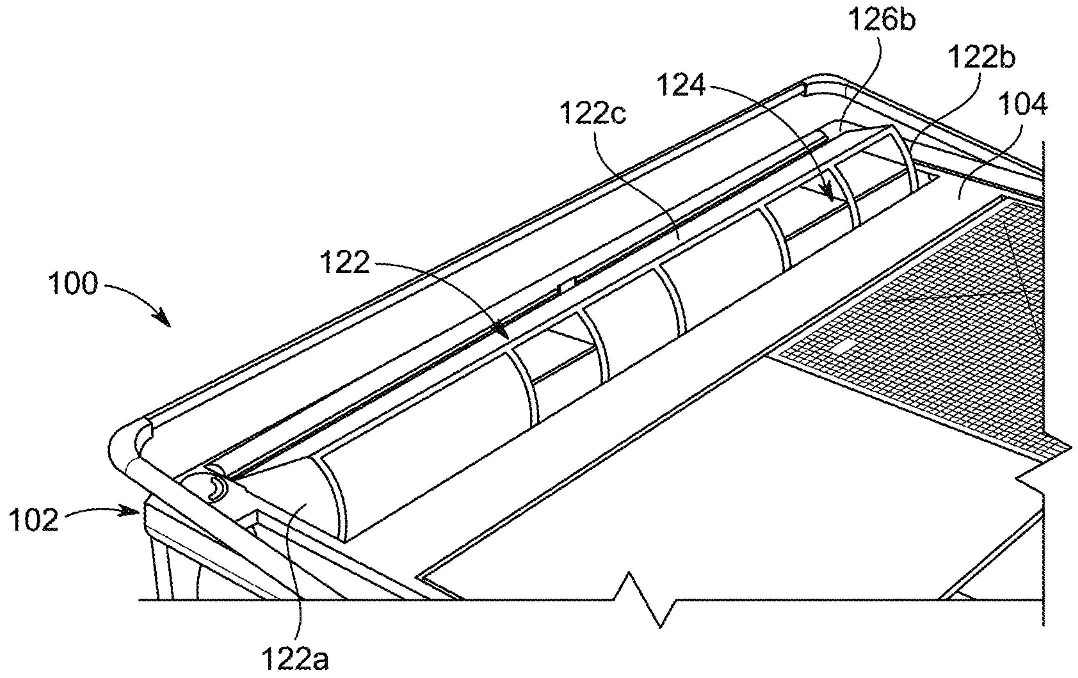
FIG. 3B is a partial perspective diagram of the adaptable workdesk showing the tool holder in an open position thereof, according to certain embodiments.

FIGS. 3A and 3B illustrate partial views of the adaptable workdesk 100, with the tool holder 122 in its closed position and open position, respectively. As shown, the adaptable workdesk 100 provides a plurality of divided compartments 124 located within the tool holder 122. The divided compartments 124 are designed to store and organize various tools and materials essential for industrial design and related tasks. The divided compartments 124 within the tool holder 122 allow for efficient organization and separation of different tools or small components, preventing them from becoming mixed or misplaced. This organized storage solution helps to maintain a clutter-free workspace and enables the user to quickly locate and retrieve the required tools or materials as needed during the design process.

The adaptable workdesk 100 includes a first hinge 126*a* connected within the first recess 120 to a first end 122*a* of the tool holder 122, and a second hinge 126*b* connected within the first recess 120 to a second end 122*b* of the tool holder 122. The first hinge 126*a* and the second hinge 126*b* are configured to permit the tool holder 122 to rotate between an open position and a closed position. In the open position, the plurality of divided compartments 124 within the tool holder 122 are accessible to the user, allowing for easy retrieval and storage of tools and materials. In the closed position, a top wall 122*c* of the tool holder 122 is flush with the work surface 102, providing a large, unobstructed area. This rotatable design of the tool holder 122, facilitated by the first hinge 126*a* and the second hinge 126*b*, provides a versatile solution for tool organization and storage. When not in use, the tool holder 122 can be rotated to the closed position, ensuring that the top side 104 of the work surface 102 remains clear and uncluttered, maximizing the available workspace. However, when the user needs to access or store tools and materials, the tool holder 122 can be rotated to the open position, allowing access to the plurality of divided compartments 124 for convenient access and organization.

Figure 4A:
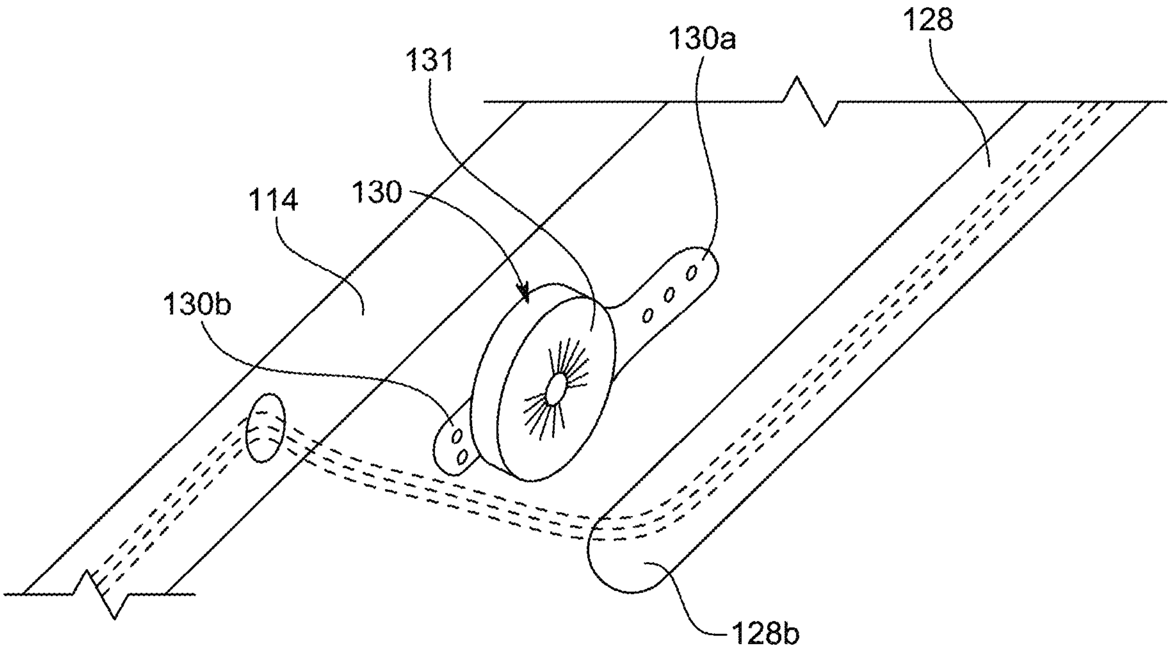
FIG. 4A is a partial perspective diagram of the adaptable workdesk showing zoomed-in view of a rotation mechanism for supporting a light bar therein, according to certain embodiments.

Referring back to FIGS. 1A-1B, as illustrated, the adaptable workdesk 100 includes a light bar 128. The light bar 128 is designed to enhance the functionality and versatility of the lighting within the workspace. The light bar 128 has a flattened U-shape. Such flattened U-shape allows for a wide distribution of light, covering a greater area of the work surface 102, as discussed later in more detail. The light bar 128 has a left end 128*a* and a right end 128*b*. Herein, each of the left end 128*a* and the right end 128*b* are rotatably attached to the left edge 112 and the right edge 114 of the adaptable workdesk respectively by a rotation mechanism 130, as illustrated in FIG. 4A (with only connection at the right end 128*b* being shown). Specifically, the left end 128*a* of the light bar 128 is rotatably attached to the left edge 112 of the work surface 102 by a first portion of the rotation mechanism 130 (not shown in associated drawings), and the right end 128*b* of the light bar 128 is rotatably attached to the right edge 114 of the work surface 102 by a second portion of the rotation mechanism 130 (as illustrated in FIG. 4A). Herein, the first portion of the rotation mechanism 130 and the second portion of the rotation mechanism 130 are replica of each other. The rotation mechanism 130 is configured to rotate the light bar 128 at selectable angles with respect to the top side 104 of the work surface 102. Thereby, the rotation mechanism 130 allows the user to position the light bar 128 at an angle that best suits their needs, such as customize the direction and focus of the lighting based on specific task requirements or personal preferences.

As illustrated in FIG. 4A, each rotation mechanism 130 includes a first mounting bracket 130*a* and a second mounting bracket 130*b*. The first mounting bracket 130*a* is configured to connect to an outer edge of a respective leg of the flattened U-shaped light bar 128, and the second mounting bracket 130*b* is configured to connect to a respective right edge 114 or left edge 112 of the work surface 102. The mounting brackets 130*a*, 130*b* are designed to securely attach the rotation mechanism 130 to the light bar 128 and the work surface 102, respectively. This allows the light bar 128 to be rotated to different angles while maintaining a secure connection to both the work surface 102 and the light bar 128. The mounting brackets 130*a*, 130*b* can be made of metal or any other suitable material that can provide sufficient strength and durability to support the weight of the light bar 128 and withstand the forces generated during rotation.

In an aspect, the adaptable workdesk 100 includes a dial 131 located on each rotation mechanism 130 of the light bar 128. The dial 131, associated with the rotation mechanism 130, enhances the functionality and user interaction with the light bar 128. The dial 131 includes markings (as shown) that indicate the angular position of the light bar 128 with respect to the top side 104 of the work surface 102. The dial 131 allows the user to precisely adjust and set the angle of the light bar 128 to achieve the desired lighting effect. The markings on the dial 131 provide a visual reference for the user, enabling them to easily replicate a specific lighting setup or to make incremental adjustments as needed. The dial 131 can be made of plastic or any other suitable material that is easy to grip and turn. The markings on the dial 131 can be printed, engraved, or otherwise affixed to the dial 131. The dial 131 adds to the overall ergonomic design by allowing users to adjust the light bar 128 to a desired angle without the need for complex measurements or guesswork.

Figure 4B:
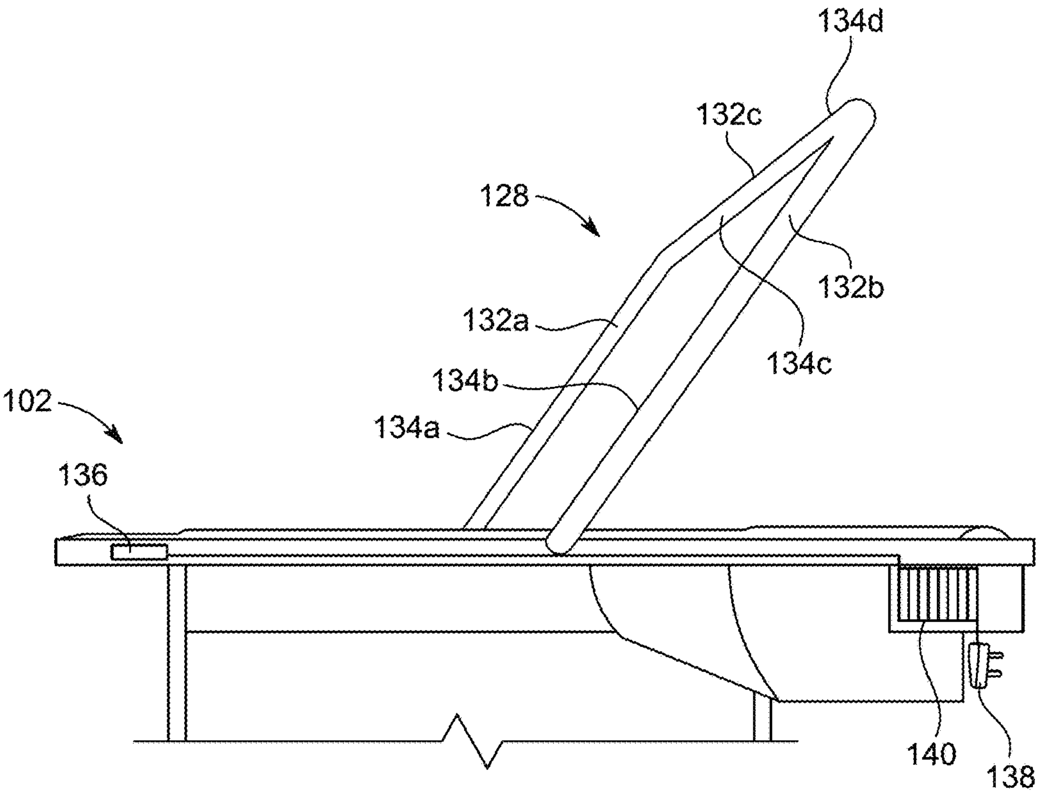
FIG. 4B is a side perspective diagram of the adaptable workdesk showing electrical connections for the light bar, according to certain embodiments.

Further, as illustrated in FIG. 4B, the flattened U-shape light bar 128 includes an inside left leg 132*a*, an inside right leg 132*b*, and a central section 132*c* connecting the inside left leg 132*a* and the inside right leg 132*b*. The light bar 128 includes multiple strips of LED lights, each serving a distinct purpose to enhance lighting conditions based on the user's needs. As shown, the adaptable workdesk 100 includes a first strip of LED lights 134*a* located along the inside left leg 132*a* of the flattened U-shape of the light bar 128. A second strip of LED lights 134*b* (generally represented in FIG. 4B) is located along the inside right leg 132*b* of the flattened U-shape of the light bar 128. A third strip of LED lights 134*c* is located along an inside of the central section 132*c* of the flattened U-shape between the first strip of LED lights 134*a* and the second strip of LED lights 134*b*. A fourth strip of LED lights 134*d* (generally represented in FIG. 4B) is located along a back side of the central section 132*c*. Together, the three strips of LED lights 134*a*, 134*b*, 134*c* create balanced lighting across the work surface 102 and reduce shadows that might impede visibility. The placement of the fourth strip of LED lights 134*d* is particularly effective in casting light towards the rear of the work surface 102 and the wall or backdrop behind the work surface 102, which can help in reducing glare and improving the ambient lighting around the work surface 102. The multiple strips of LED lights 134*a*, 134*b*, 134*c*, 134*d* allow for customizable lighting options, with the user able to select which strips are illuminated and at what intensity.

Figure 4C:
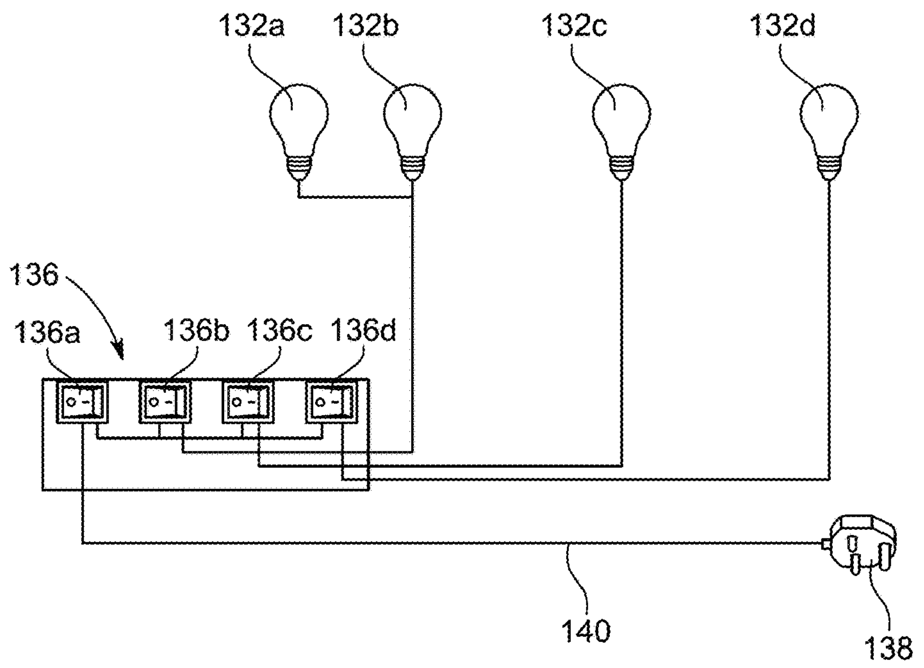
FIG. 4C is a circuit diagram of the electrical connections for the light bar, according to certain embodiments.

Further referring to FIGS. 4B and 4C in combination, as illustrated, the adaptable workdesk 100 further includes a light control panel 136 located near the front edge 108 between the inset section 116 and the right edge 114. The light control panel 136 includes a first switch 136*a*, a second switch 136*b*, a third switch 136*c*, and a fourth switch 136*d*. The first switch 136*a* is connected to a source of electrical power, such as a wall outlet. The second switch 136*b* is connected to the first switch 136*a*, the first strip of LED lights 134*a*, and the second strip of LED lights 134*b*. The third switch 136*c* is connected to the first switch 136*a* and the third strip of LED lights 134*c*. The fourth switch 136*d* is connected to the first switch 136*a* and the fourth strip of LED lights 134*d*. The light control panel 136 allows the user to independently control the illumination of each strip of LED lights 134*a*, 134*b*, 134*c*, 134*d* (depicted as bulbs in FIG. 4C), providing a variety of lighting options for different tasks. Each of the switches 136*a*, 136*b*, 136*c*, 136*d* provides the users with control over the lighting environment of the adaptable workdesk 100, enhancing usability and adaptability to a variety of work scenarios. The ability to activate or deactivate the strips of LED lights 134*a*, 134*b*, 134*c*, 134*d* individually allows the users to customize the light intensity and focus according to the specific requirements of their work, depending on whether even light distribution or focused illumination is required on a side or center of the work surface 102 of the adaptable workdesk 100.

In the present configuration, as illustrated in FIGS. 4B and 4C, the source of electrical power is a power receptacle 138 located on the rear edge 110 of the top side 104 near the right edge 114. The power receptacle 138 is designed to provide power to electronic devices, such as laptops, tablets, or smartphones, as well as to the light control panel 136. A power cord 140 is configured to connect the power receptacle 138 to a wall outlet or other source of electrical power. The power cord 140 allows the user to plug in electronic devices without having to reach under the adaptable workdesk 100 or use an extension cord. In an example, the power cord 140 is retractable and may retract to be disposed inside a slot in the work surface 102 of the adaptable workdesk 100, as may be seen from FIG. 4B. This functionality provides easy access for plugging in various electronic devices while maintaining a clean and uncluttered workspace. The placement near the rear edge 110 also helps in managing and concealing the power cord 140 that might otherwise interfere with the work surface area.

In the adaptable workdesk 100 of the present disclosure, the left edge 112 and the right edge 114 of the work surface 102 are each indented to form a channel that receives the light bar 128 when it is in the non-deployed position. These indentations (as represented by reference numeral 129 in FIGS. 1A and 1B) begin at the rear edge 110 and extend forwardly to about three-quarters of the distance from the rear edge 110 to the front edge 108. The indentations 129 are sized and shaped to receive the inside left leg 132*a* and the inside right leg 132*b* of the light bar 128. The placement of these indentations 129 allows for the easy deployment and retraction of the light bar 128. This configuration allows the light bar 128 to be stored out of the way when not in use, maximizing the available workspace on the top side 104 of the work surface 102 and enhancing the adaptability of the adaptable workdesk 100 to various tasks without requiring additional storage solutions or modifications.

Figure 5:
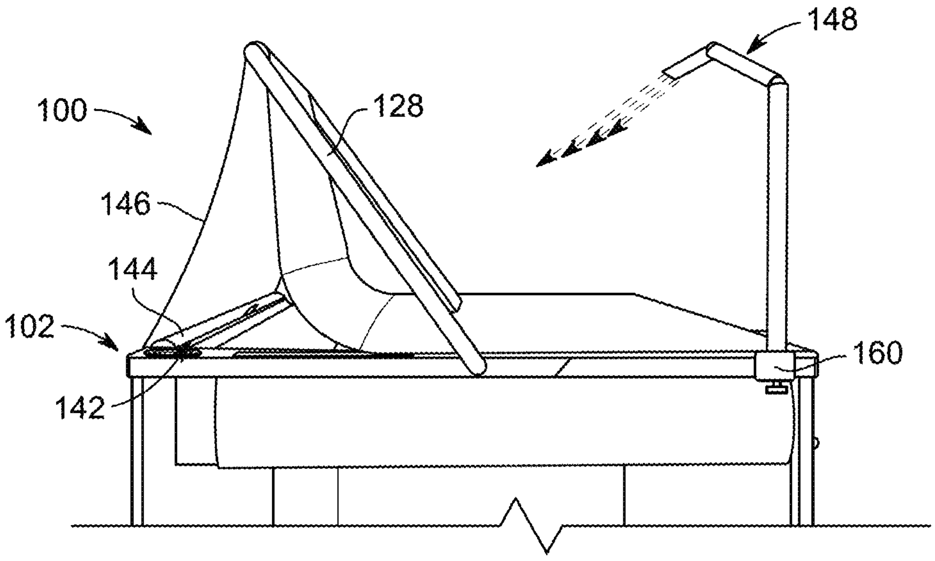
FIG. 5 is a side perspective diagram of the adaptable workdesk showing an arrangement for utilizing a photography backdrop sheet therein, according to certain embodiments.

Referring back to FIGS. 1A-1B, the adaptable workdesk 100 incorporates a second recess 142 located in the top side 104 between the rear edge 110 and the tool holder 122. This location utilizes space effectively by positioning the second recess 142 close to the rear of the adaptable workdesk 100, ensuring it does not interfere the work surface 102. In the adaptable workdesk 100, the second recess 142 spans horizontally across the entire width of the work surface 102 from the left edge 112 to the right edge 114. Referring to FIG. 5, as shown, the second recess 142 is specifically configured to hold a roller 144 (also visible in FIG. 2) connected between the left edge 112 and the right edge 114. The roller 144 is designed to accommodate various types of rollable materials, such as paper, fabric, or other media that may be needed for tasks performed at the adaptable workdesk 100. This configuration allows for the material to be easily accessed and pulled from the roller 144 across the work surface 102 when needed, and rolled back and stored within the second recess 142 when not in use.

In an aspect of the present disclosure, as illustrated in FIG. 5, a photography backdrop sheet 146 is connected to the roller 144. As shown, the photography backdrop sheet 146 is configured to pull out of the second recess 142 and drape over the light bar 128 when the light bar 128 is deployed at an angle in a range of 45 to 90 degrees with respect to the top side 104. It may be understood that the photography backdrop sheet 146 is stored on the roller 134 in the second recess 142 when not in use. The photography backdrop sheet 146 may be made of a white fabric material that can be easily pulled out and retracted. The photography backdrop sheet 146 provides a clean and consistent background for photographing products or prototypes, and the ability to adjust the angle of the light bar 128 allows for customized lighting to achieve desired photographic effects. The ability to quickly deploy and adjust the backdrop using the photography backdrop sheet 146, coupled with the adjustable lighting provided by the light bar 128, provides the users a high degree of control over their visual environment.

Figure 6A:
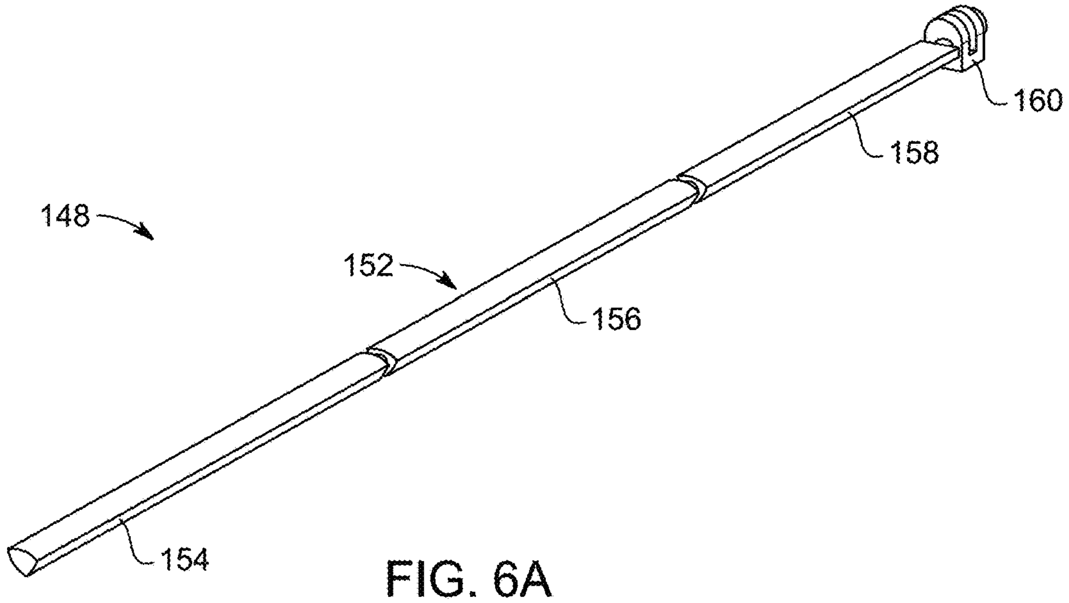
FIG. 6A is a perspective diagram of a moveable light utilized in the adaptable workdesk, according to certain embodiments.
Figure 6B:
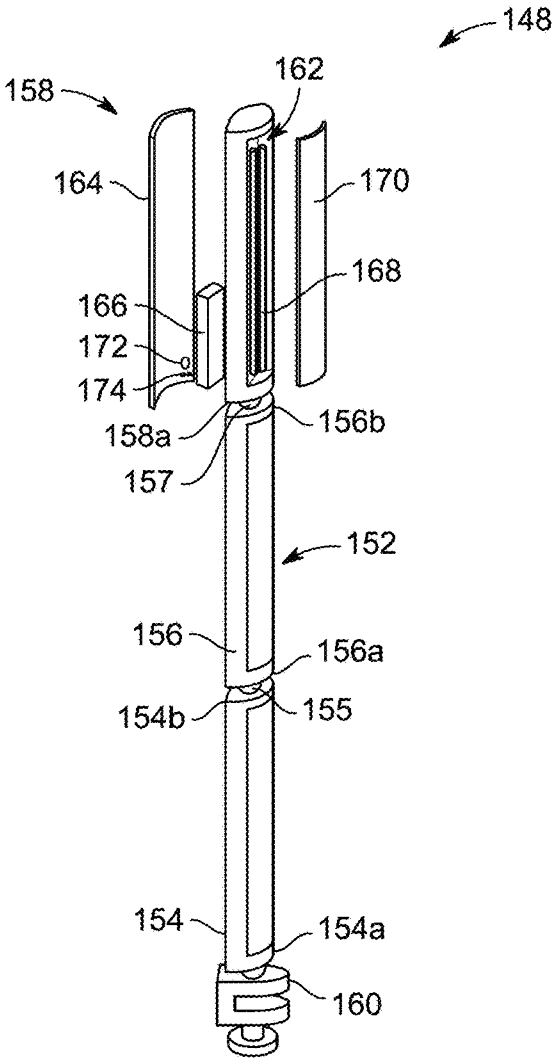
FIG. 6B is a detailed, partially exploded diagram of the moveable light, according to certain embodiments.

Further, as shown in FIGS. 1A, 1B and FIG. 5, the adaptable workdesk 100 includes a moveable light 148. The adaptable workdesk 100 includes a storage in the form of a third recess 150 located in the top side 104 between the rear edge 110 and the tool holder 122. The third recess 150 is configured to store the moveable light 148, when not in use. The moveable light 148 is designed to be removable from the third recess 150 and provide additional task lighting as needed. The third recess 150 helps to keep the work surface 102 organized and clutter-free and ensures that the moveable light 148 is readily available when needed. FIG. 6A illustrates the moveable light 148, when removed. FIG. 6B illustrates a detailed view of the moveable light 148. As shown, the moveable light 148 includes a stalk 152 including three sections, namely a first section 154, a center section 156 and a neck section 158. The first section 154 has a first end 154*a* connected to a C-clamp 160. The C-clamp 160 is configured to moveably attach the stalk 152 to a position on one of the left edge 112, the right edge 114, the rear edge 110, and the front edge 108 of the work surface 102 (as depicted in FIG. 5). Thereby, the C-clamp 160 allows the moveable light 148 to be positioned in a variety of locations around the work surface 102, providing flexibility in directing light where it is needed. The center section 156 of the stalk 152 is connected at a first end 156*a* to a second end 154*b* of the first section 154 by a first ball joint 155. The first ball joint 155 allows the center section 156 to pivot freely with respect to the first section 154, providing additional flexibility in positioning the moveable light 148. The neck section 158 is connected at a first end 158*a* to a second end 156*b* of the center section 156 by a second ball joint 157. The second ball joint 157 allows the neck section 158 to pivot freely with respect to the center section 156, providing even more flexibility in positioning the moveable light 148.

Also, as illustrated in FIG. 6B, the neck section 158 of the moveable light 148 includes a lighting recess 162. The lighting recess 162 houses a light source and associated components of the moveable light 148. In particular, herein, the moveable light 148 includes a back cover 164 configured to cover a back side of the lighting recess 162 of the neck section 158. The back cover 164 protects the internal components of the moveable light 148. The moveable light 148 also includes a rechargeable battery 166 located within the lighting recess 162 and connected to the back cover 164. The back cover 164 provides a mounting point for the rechargeable battery 166. The rechargeable battery 166 powers the moveable light 148, allowing it to be used without being tethered to an electrical outlet. The moveable light 148 further includes at least one fluorescent light 168 located within the lighting recess 162. The at least one fluorescent light 168 is electrically connected to the rechargeable battery 166. The fluorescent light 168 provides the illumination for the moveable light 148.

The moveable light 148 further includes a front cover 170 comprising a diffuser. In the present configuration, the front cover 170 may itself act as the diffuser. The front cover 170 is configured to cover the fluorescent light 168 and spread light generated by the at least one fluorescent light 168. The front cover 170, as the diffuser, helps to create a more even and less harsh light, which is beneficial for tasks that require close-up work or for reducing eye strain. The moveable light 148 further includes an ON/OFF switch 172 located on the back cover 164, allowing the user to easily turn the moveable light 148, or specifically the fluorescent light 168 therein, on and off. The back cover 164 of the moveable light 148 also includes a battery charger port 174. The battery charger port 174 is connected to the rechargeable battery 166 and allows the user to recharge the rechargeable battery 166 when it is depleted. It may be appreciated that the battery charger port 174 can be connected to a standard USB charger or other compatible charging device.

Figure 6C:
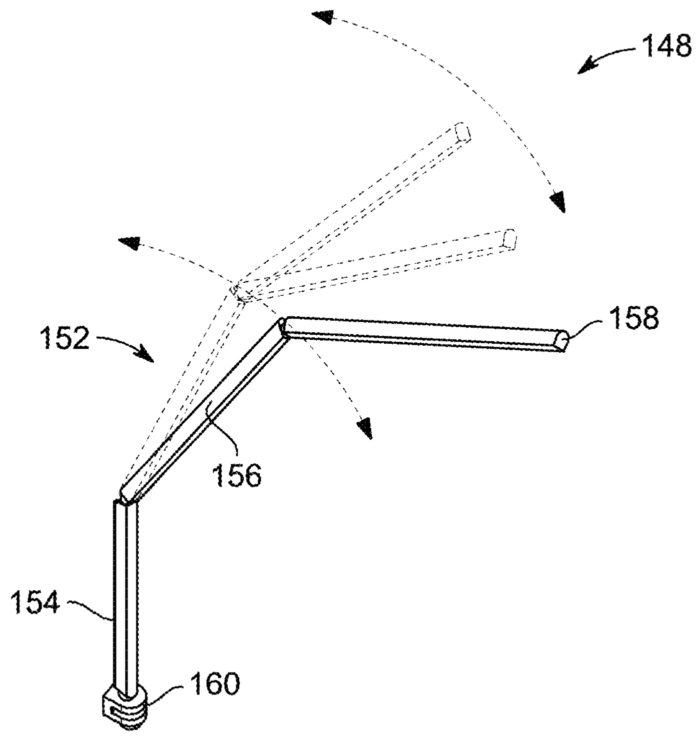
FIG. 6C is an exemplary diagram depicting implementation of the moveable light for use in different positions, according to certain embodiments.
Figure 6D:
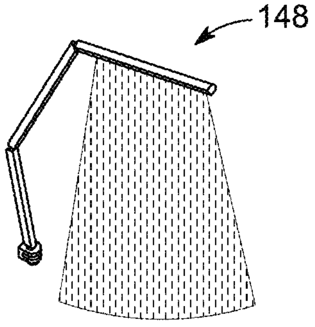
FIG. 6D is an exemplary diagram depicting implementation of the moveable light in a first position, according to certain embodiments.
Figure 6E:
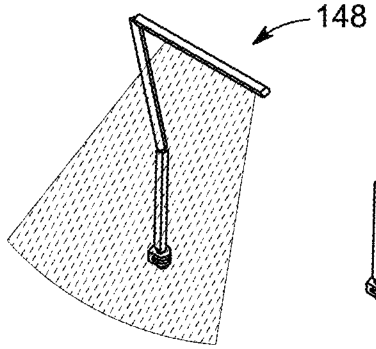
FIG. 6E is an exemplary diagram depicting implementation of the moveable light in a second position, according to certain embodiments.
Figure 6F:
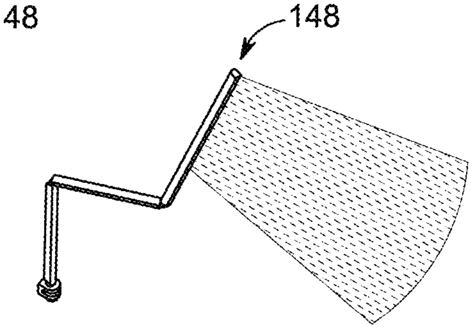
FIG. 6F is an exemplary diagram depicting implementation of the moveable light in a third position, according to certain embodiments.

FIG. 6C illustrates the moveable light 148 of the adaptable workdesk 100, depicting its flexible and articulated design for targeted illumination. The moveable light 148 including the stalk 152 segmented into three sections 154, 156, 158, allows for a high degree of maneuverability and positional adjustment. FIGS. 6D, 6E, and 6F depict various positions of the moveable light 148, demonstrating its flexibility and range of motion. Specifically, FIG. 6D depicts a position which is optimal for tasks that require concentrated light from above, reducing shadows and providing clear visibility of the workspace below. FIG. 6E shows the moveable light 148 in an intermediate position suitable for activities that require intense, directed light to highlight specific details during intricate tasks. FIG. 6F depicts the moveable light 148 fully extended, which allows the light to cover a broader area, suitable for lighting up a larger portion of the workspace when broader illumination is necessary, such as when spreading out multiple documents or objects across the work surface. These different configurations of the moveable light 148 enhance the usability of the adaptable workdesk 100 by enabling users to customize their lighting environment to match their specific working needs.

Referring back to FIGS. 1A-1B, as illustrated, the adaptable workdesk 100 includes a U-shaped leg 176. The U-shaped leg 176 has a first leg 176*a* attached to the left edge 112 near the front edge 108 and a second leg 176*b* attached to the left edge 112 near the rear edge 110. In the adaptable workdesk 100, the U-shaped leg 176 provides support and stability to the left side of the work surface 102. The U-shaped leg 176 supports the weight of the work surface 102 and its contents, and also contributes to the aesthetic appeal to the design of the adaptable workdesk 100, maintaining a clean and modern look while ensuring that the adaptable workdesk 100 remains steady and secure during use. Further, a support leg 178 is attached to the right edge 114 of the work surface 102 near the rear edge 110. The support leg 178 is designed to provide additional support and stability to the right side of the work surface 102. The adaptable workdesk 100 also includes a support wall 180 on the right side of the work surface 102. The support wall 180 is slidably attached to the right edge 114 of the work surface 102. The support wall 180 is positioned between the support leg 178 and the front edge 108 of the work surface 102. The placement of the support leg 178 near the rear edge 110 helps to counterbalance the weight of the support wall 180, preventing the work surface 102 from tipping over and the adaptable workdesk 100 from becoming unstable.

Figure 7A:
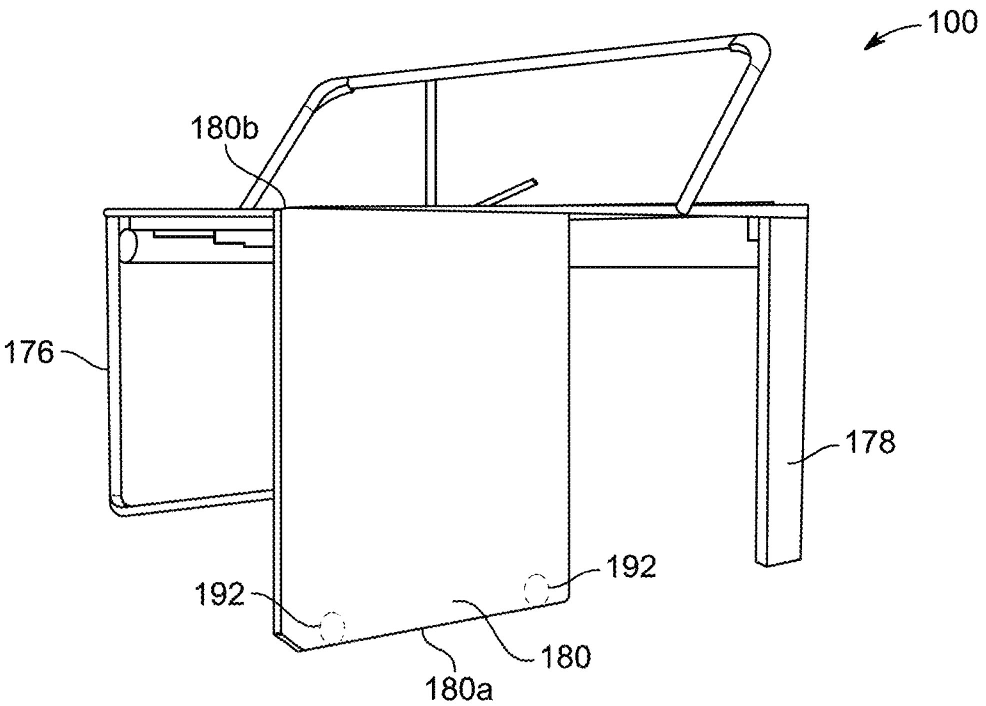
FIG. 7A is a right-side perspective diagram of the adaptable workdesk showing a support wall disposed in a deployed position therein, according to certain embodiments.
Figure 7B:
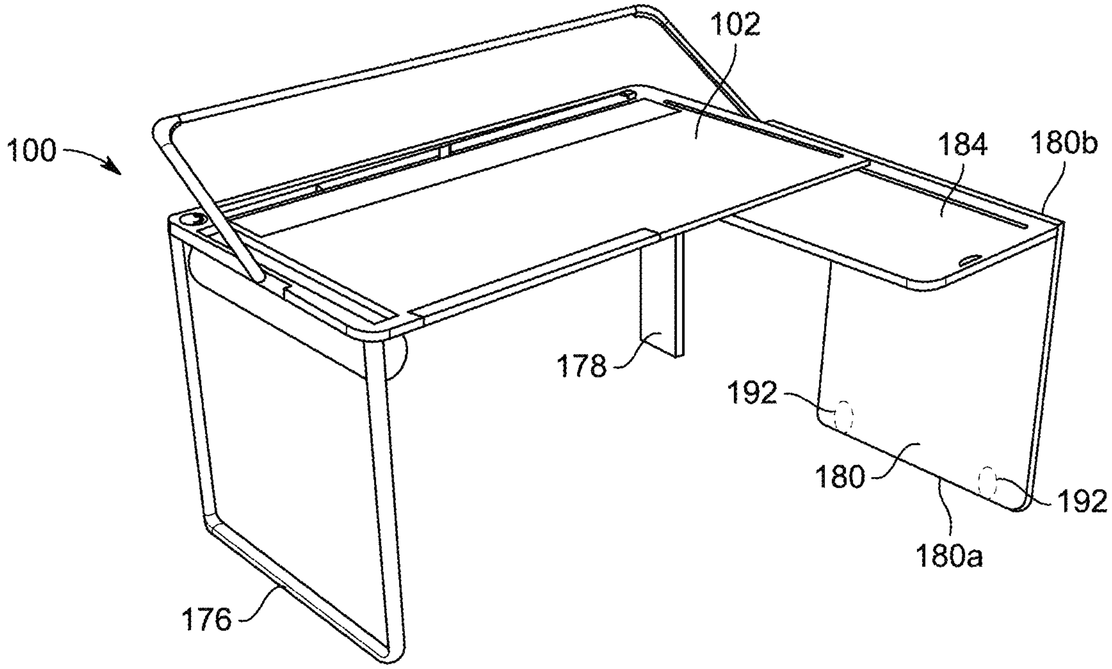
FIG. 7B is a left-side perspective diagram of the adaptable workdesk showing the support wall disposed in the deployed position therein, according to certain embodiments.

Herein, the support wall 180 is configured to slide between a stowed position (as depicted in FIGS. 1A and 1B) and a deployed position (as depicted in FIGS. 7A and 7B). In the stowed position, a front edge 182 of the support wall 180 is flush with the front edge 108 of the work surface 102. In the deployed position, the front edge 182 of the support wall 180 extends outwardly from the front edge 108 of the work surface 102. As illustrated in FIGS. 7A and 7B, the adaptable workdesk 100 further includes a side table 184 rotatably and detachably connected to the support wall 180. The support wall 180 serves as a mounting point for the side table 184, and its ability to slide allows the side table 184 to be positioned in different locations relative to the work surface 102. This design allows the side table 184 to be used in multiple orientations and locations, serving as an auxiliary work surface that can be positioned as needed for specific tasks or stowed away when not required. Also, the ability to detach the side table 184 offers flexibility, enabling it to be used independently from the work surface 102. The side table 184 is designed to be multifunctional, serving as a platform for a laptop, a space for reference materials, or a surface for additional work. The side table 184 can be rotated to different angles relative to the work surface 102, allowing the user to position it in a way that best suits their needs. The side table 184 can also be detached from the support wall 180, providing the user with even more flexibility in how they use the adaptable workdesk 100.

Figure 7C:
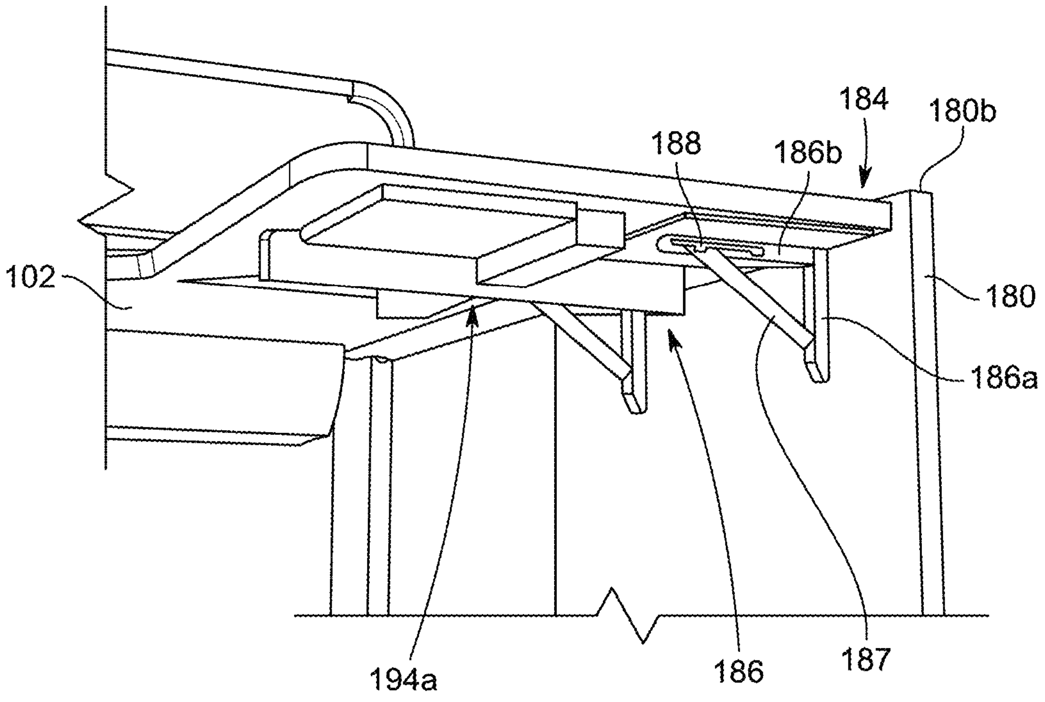
FIG. 7C is a partial bottom perspective diagram of the adaptable workdesk showing a side table rotated to an open configuration, with the support wall in the deployed position, according to certain embodiments.

FIGS. 7B and 7C illustrate the side table 184 in its open position. As shown in FIG. 7C, the side table 184 is supported by a pair of collapsible brackets 186. The side table 184 is supported by a pair of collapsible brackets 186. Each of the collapsible brackets 186 includes a mounting bracket 186*a* and a side table support bracket 186*b*. The mounting bracket 186*a* is configured to connect to the support wall 180 near the bottom side 106 of the work surface 102. The side table support bracket 186*b* is hingeably connected to the mounting bracket 186*a*, allowing it to rotate. A strut 187 is connected between the mounting bracket 186*a* and the side table support bracket 186*b*. The strut 187 has a first end 187*a* connected to the mounting bracket 186*a* and a second end 187*b* connected within a track 188 in the side table support bracket 186*b*. The strut 187 is configured to slide within the track 188, which allows the side table support bracket 186*b* to rotate between two positions. In the first position, when the support wall 180 is in the stowed position, the side table support brackets 186*b* are adjacent to the mounting brackets 186*a*. This configuration keeps the side table 184 in a compact and stored position, minimizing its footprint and maximizing the available workspace on the work surface 102. In the second position, when the support wall 180 is in the deployed position, the side table support brackets 186*b* are perpendicular to the mounting brackets 186*a*. This configuration extends the side table 184 outward from the work surface 102, providing a larger and more accessible work area. As discussed, the side table 184 can be used to support a laptop, reference materials, or other items, and its ability to rotate allows the user to position it in a way that best suits their needs.

Figure 7D:
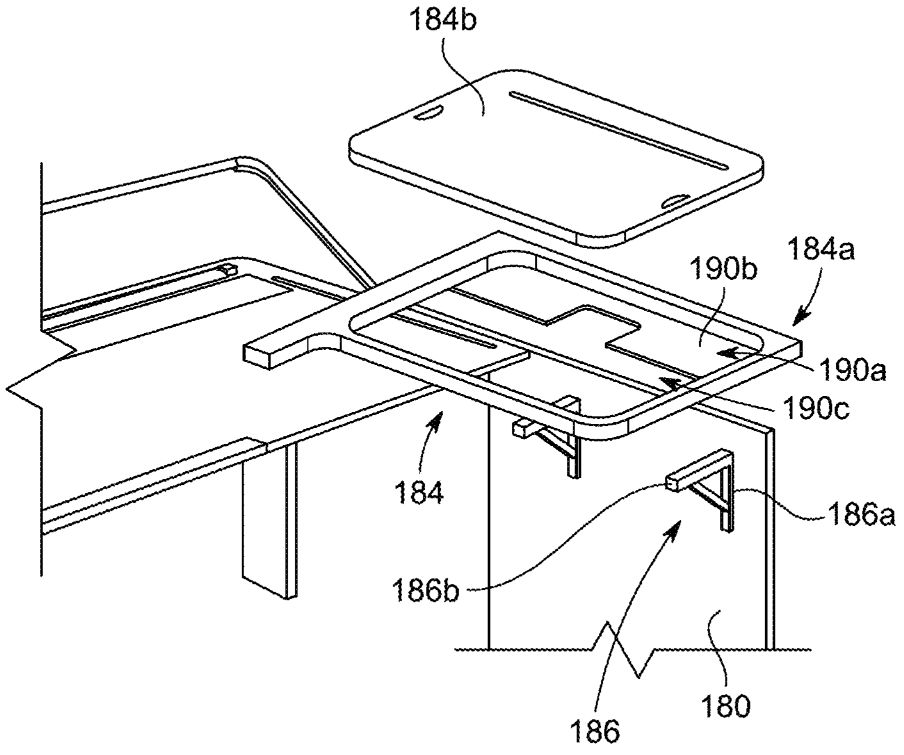
FIG. 7D is a partial perspective and exploded diagram of the adaptable workdesk showing components of the side table therein, according to certain embodiments.

Further, as illustrated in FIG. 7D, the side table 184 includes a support frame 184*a*. Herein, the support frame 184*a* is connected to the side table support brackets 186*b*. The support frame 184*a* is designed to hold a portable table 184*b*, which can be detached to create additional workspace or to be used in other locations. The support frame 184*a* is designed to accommodate the portable table 184*b*, facilitating easy attachment and detachment while maintaining the structural integrity needed for a stable work surface. The support frame 184*a* can be made of a sturdy material such as metal or plastic to ensure that it can securely hold the portable table 184*b* in place. In some configurations, the connection between the portable table 184*b* and the support frame 184*a* can be achieved through various means, such as clips, magnets, or other suitable mechanisms that allow for easy attachment and detachment. The portable table 184*b* is detachably held by the support frame 184*a*, allowing it to be easily removed and used independently. To take the portable table 184*b* from the support frame 184*a*, the user can insert his hand into a small, curved space (as shown) formed in the portable table 184*b* and can then lift up the portable table 184*b*. This feature enhances the adaptability of the adaptable workdesk 100 by providing a versatile workspace that can be configured to meet the user's needs. For example, the portable table 184*b* can be used as a separate drawing surface or for holding reference materials, providing additional flexibility and convenience.

Figure 7E:
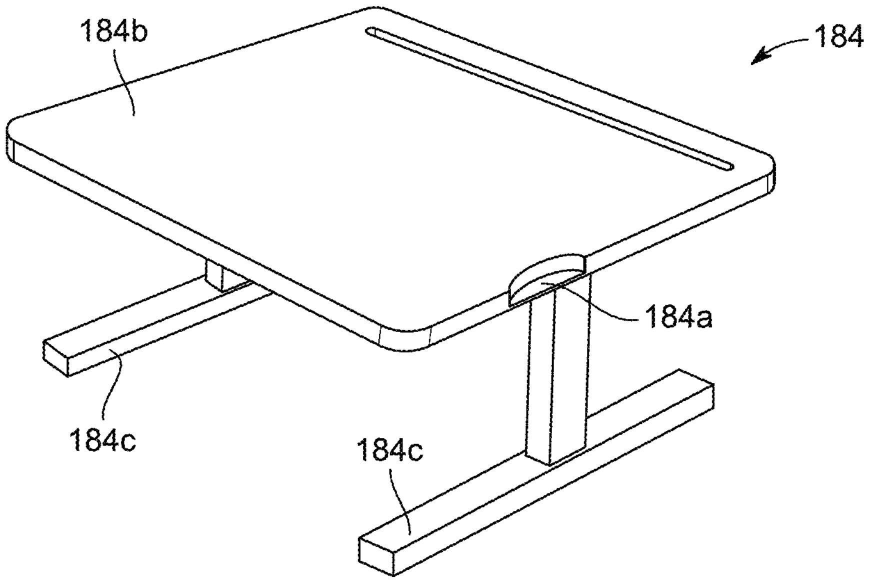
FIG. 7E is a perspective diagram of the side table in its open configuration, according to certain embodiments.

In an aspect of the present disclosure, as illustrated in FIG. 7E, the side table 184 further includes a set of collapsible legs 184*c*. Each collapsible leg 184*c* is attached by a hinge (not shown) to the underside of the side table 184. The set of collapsible legs 184*c* are configured to lie adjacent to the underside of the side table 184 when the support wall 180 is in the stowed position (as may be understood from FIG. 1B). The hinges enable the set of collapsible legs 184*c* to fold flat against the underside of the side table 184 when not in use, minimizing the space required for storage. When the support wall 180 is in the deployed position and the portable table 184*b* is detached from the support frame 184*a*, the collapsible legs 184*c* can be rotated to an open position to support the side table 184 (as depicted in FIG. 7E). This allows the side table 184 to be used as a standalone, freestanding unit, providing additional flexibility and functionality to the adaptable workdesk 100.

Herein, as illustrated in FIG. 7D, a groove 190*a* is located within an inner perimeter of the support frame 184*a*. Herein, the groove 190*a* may be in the form of a cutout formed the support frame 184*a*. The groove 190*a* is designed to receive and hold the portable table 184*b* securely when it is attached to the support frame 184*a*. This ensures that the portable table 184*b* remains stable and does not wobble or shift during use. Further, a portable table support panel 190*b* is located beneath the support frame 184*a* and near an edge of the support frame 184*a* which is adjacent to the support wall 180. The portable table support panel 190*b* includes a cutout 190*c* around the collapsible legs 184*c*, allowing the collapsible legs 184*c* to rotate freely between the stowed and open positions. The portable table support panel 190*b* provides additional support to the portable table 184*b* when it is attached to the support frame 184*a*. The cutout 190*c* in the portable table support panel 190*b* allows the collapsible legs 184*c* to fold flat against the underside of the side table 184 when not in use, minimizing the space required for storage. The portable table support panel 190*b* can be made of a sturdy material such as metal or plastic to ensure that it can provide adequate support to the portable table 184*b*. In some examples, the portable table support panel 190*b* may be provided with a layer of rubber or silicone or the like to provide sufficient friction to hold the portable table 184*b* in place.

Further, as illustrated in FIGS. 7A and 7B, a set of swivel wheels 192 are connected to a bottom edge 180*a* of the support wall 180. In the present configuration, the swivel wheels 192 may be disposed (and hidden) inside the support wall 180, and thus represented with dashed lines in the associated drawings. The swivel wheels 192 due to being not visible when the support wall 180 is in either the stowed or deployed position, help to maintain the aesthetic appeal of the adaptable workdesk 100. The swivel wheels 192 are configured to rotate when the support wall 180 is moved between the stowed position and the deployed position. This allows the support wall 180 to move smoothly and easily, for instance, even on carpeted surfaces. The swivel wheels 192 are made from durable materials capable of withstanding the weight and frequent movement of the support wall 180 for reliability.

Figure 7F:
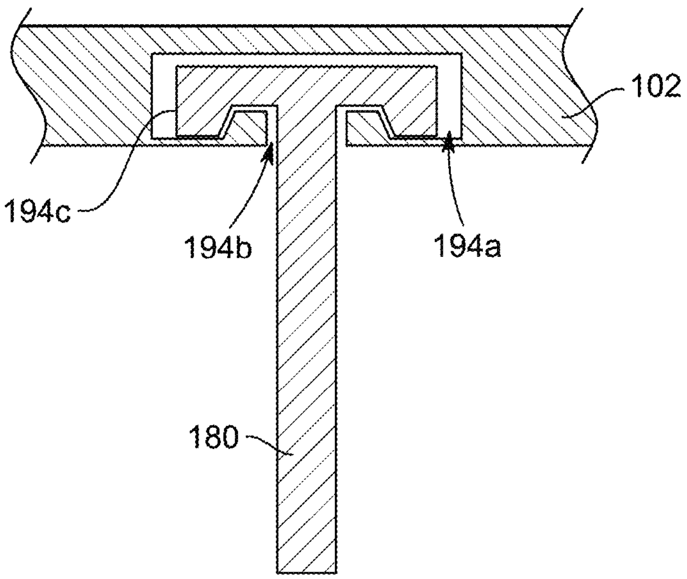
FIG. 7F is a section view of a portion of the adaptable workdesk towards a right edge of the work surface thereof, according to certain embodiments.

In the present configuration for moving the support wall 180 between the stowed position and the deployed position, the adaptable workdesk 100 includes a channel 194*a* which is located on the bottom side 106 of the work surface 102 near the right edge 114 (as may be seen in FIG. 7C). The channel 194*a* extends from the rear edge 110 to the front edge 108 of the work surface 102. FIG. 7F illustrates a section view along a lateral axis of the channel 194*a*. A track 194*b* is located in the channel 194*a*. Further, a T-shaped slide 194*c* is attached to a top edge 180*b* (as shown in FIGS. 7A-7C) of the support wall 180. The T-shaped slide 194*c* is configured to slide within the track 194*b*. This configuration allows the support wall 180 to slide smoothly and easily between the stowed and deployed positions. The channel 194*a* and the track 194*b* guide the movement of the support wall 180, ensuring that it remains stable and aligned with the work surface 102. The T-shaped slide 194*c* provides a secure connection between the support wall 180 and the track 194*b*, preventing the support wall 180 from wobbling or coming loose during use.

In an aspect of the present disclosure, as illustrated in FIG. 2, the adaptable workdesk 100 also includes an open slot 196*a* located between the left edge 112 and the flat work section 118. The placement of the open slot 196*a* is designed to utilize space effectively, offering additional utility without compromising the usable area of the work surface. The open slot 196*a* is configured to hold a fabric loop 196*b* as shown in FIG. 1B. In particular, the open slot 196*a* allows access to material stored in the fabric loop 196*b*. Herein, the fabric loop 196*b*, generally, has a cylindrical shape. The fabric loop 196*b* can be used to store rolls of drawings sheets which could be easily accessed from the open slot 196*a* if needed or may be used to hang tools or other items, providing additional storage and organization options for the user. The fabric loop 196*b* can be made of any suitable material that is strong and durable enough to hold the weight of the items being hung. The open slot 196*a* is strategically positioned near the flat work section 118, making it easily accessible for the user to hang or retrieve items while working.

Figure 8A:
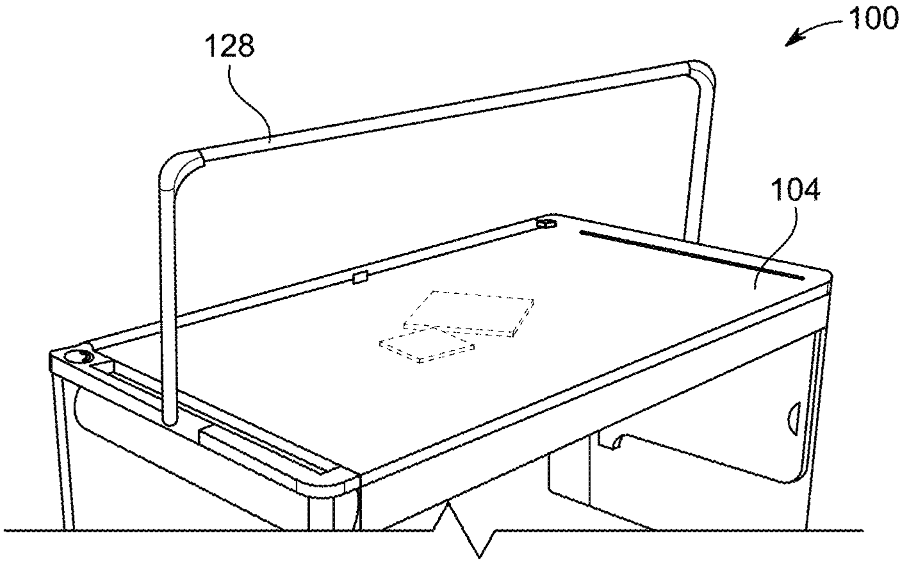
FIG. 8A is an exemplary implementation of the adaptable workdesk configured for a drawing task, according to certain embodiments.

FIG. 8A illustrates the exemplary implementation of the adaptable workdesk 100 configured for the drawing task. As depicted, herein, the light bar 128 is deployed at the angle of approximately 90° with respect to the top side 104 of the work surface 102, which may be set by the user using the markings on the dial 131 of the rotation mechanism 130 (not visible). The strips of LED lights 134*a*, 134*b*, 134*c* (not visible) in the light bar 128 are illuminated to provide lighting for the said drawings task. In this configuration, the light bar 128 is positioned to provide ample illumination across the work surface 102, ensuring that the entire area is well-lit. This setup is particularly beneficial for tasks requiring precise and detailed visibility, such as drawing, where proper lighting is crucial for accuracy and comfort.

Figure 8B:
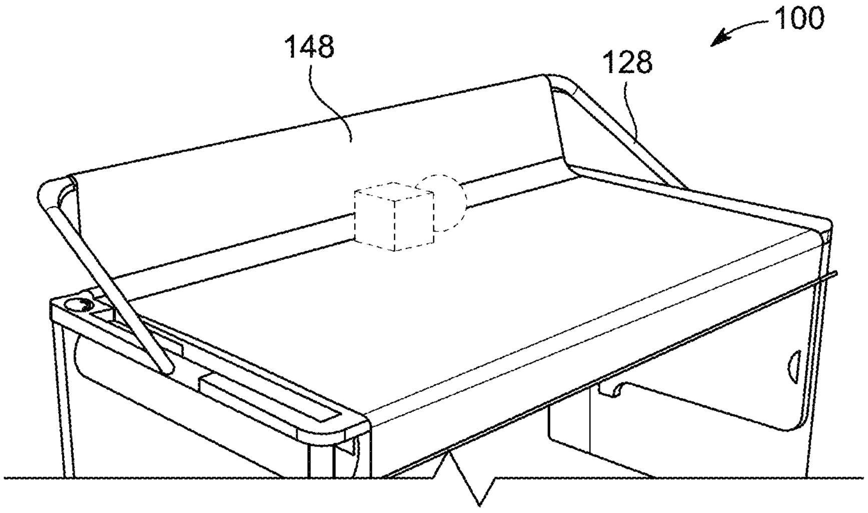
FIG. 8B is an exemplary implementation of the adaptable workdesk configured for a photography task involving short items, according to certain embodiments.

FIG. 8B illustrates an exemplary implementation of the adaptable workdesk 100 configured for a photography task involving short items, such as a cuboid and a ball-shaped object. The photography backdrop sheet 146 is extended to a lower extent to create an appropriate background. In this setup, the light bar 128 is deployed at a lower angle of approximately 30 degrees. This configuration ensures that the light bar 128 provides adequate illumination while complementing the height of the objects being photographed, thereby enhancing the quality of the photographs by minimizing shadows and glare.

Figure 8C:
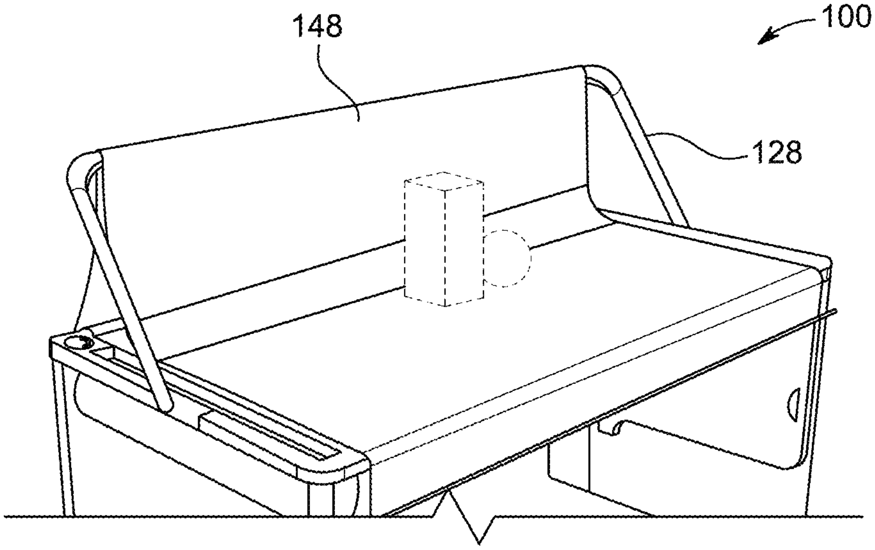
FIG. 8C is an exemplary implementation of the adaptable workdesk configured for a photography task involving tall items, according to certain embodiments.

FIG. 8C illustrates an exemplary implementation of the adaptable workdesk 100 configured for photographing taller items, such as a tall cuboid and a ball-shaped object. In this scenario, the photography backdrop sheet 146 is pulled to a greater extent to adequately cover the background for the taller items. The light bar 128 in this arrangement is deployed at a higher angle of about 60 degrees, which is ideal for casting an even light across the taller objects and the extended backdrop. This adjustment in the angle of the light bar 128 helps in capturing detailed and well-lit photographs, ensuring that the features of the taller objects are clearly visible without distortion or excessive shadowing.

Figure 8D:
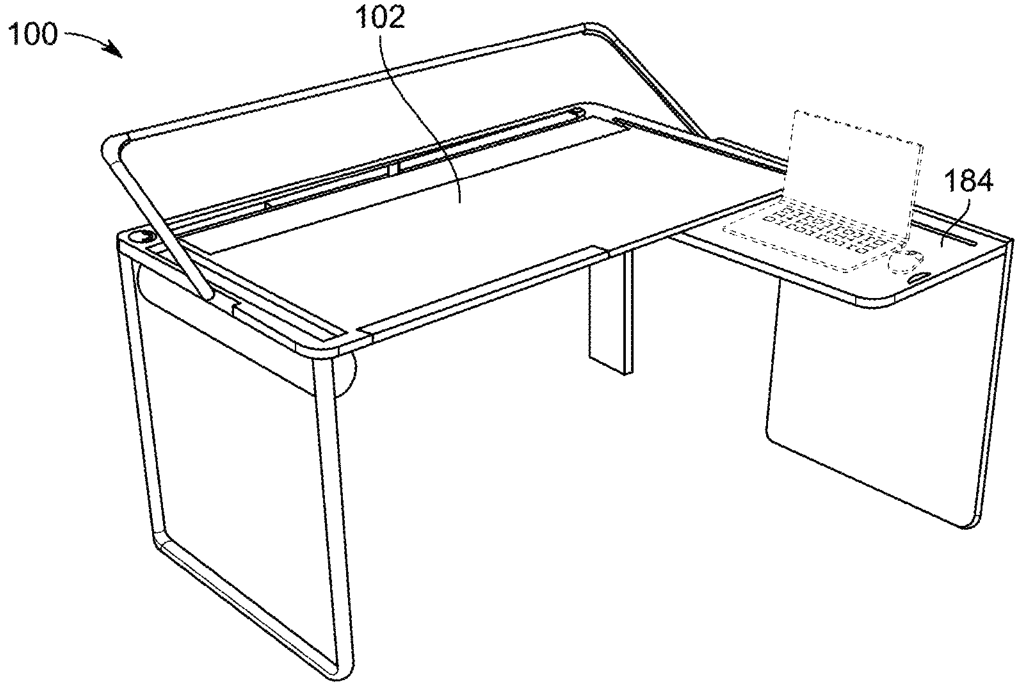
FIG. 8D is an exemplary implementation of the adaptable workdesk configured with the side table extended to facilitate placement of items thereon, according to certain embodiments.

FIG. 8D illustrates an exemplary implementation of the adaptable workdesk 100 configured with the side table 184 extended to facilitate the placement of a laptop or the like, providing a setup for tasks that require additional computing space adjacent to the work surface 102. In this configuration, the side table 184, which is rotatably and detachably connected to the support wall 180, is shown in its deployed position, extending outwardly from the front edge 108 of the work surface 102. This deployment is facilitated by the side table support brackets 186*b*, which are rotated to a position perpendicular to the mounting brackets 186*a*, allowing the side table 184 to provide a stable and accessible platform for the laptop. This versatile feature of the adaptable workdesk 100 enhances its functionality for users seeking a flexible and efficient work environment.

The adaptable workdesk 100 of the present disclosure includes the work surface 102 having the top side 104 and the bottom side 106, defined by the front edge 108, the rear edge 110, the left edge 112, and the right edge 114. the inset section 116 is positioned on the top side 104 near the front edge 108 and the right edge 114, specifically configured to accommodate the cutting mat. Adjacent to this, the flat work section 118 is located near the front edge 108 and the left edge 112, providing the open workspace. Within the first recess 120 on the top side 104 near the rear edge 110, the tool holder 122 is installed, capable of rotating between the open position, where its compartments 124 are accessible, and the closed position, where its top wall 122*c* is flush with the work surface 102. The light bar 128 with the U-shape extends between the left edge 112 and the right edge 114, rotatably attached via rotation mechanisms 130, allowing angle adjustments to direct light over the work surface 102 as needed. Within the second recess 142 between the rear edge 110 and the tool holder 122, the roller 144 houses the photography backdrop sheet 146 that extends over the light bar 128 when it is deployed between angles of 45 to 90 degrees, catering to photography tasks. Additionally, the adaptable workdesk 100 includes the moveable light 148, incorporated to offer focused lighting via its articulable configuration. The adaptable workdesk 100 is supported by the U-shaped leg 176 attached at both the front and rear edges on the left side and the support leg 178 on the right rear edge. The support wall 180, slidably attached to the right edge 114, transitions between the stowed position, flush with the front edge 108, and the deployed position, extending outwardly to enhance workspace functionality. The side table 184, rotatably and detachably connected to the support wall 180, includes collapsible legs 184*c* that adjust based on the deployment of the support wall 180.

The adaptable workdesk 100 of the present disclosure is specifically engineered to optimize the workspace for industrial designers by facilitating a broad range of design activities including planning, sketching, laptop use, prototyping, and photography. The adaptable workdesk 100 integrates a flat work section 118 and an inset section 116 that supports these diverse tasks. Moreover, the adaptable workdesk 100 enhances the transition between these tasks through features such as the second recess 142 equipped with the roller 144 for deploying the photography backdrop sheet 146, the open slot 196*a* for holding the fabric loop 196*b*, which can be used to hang tools or materials, and the side table 184 that can be detached and used independently, supported by collapsible legs 184*c*. The adaptable workdesk 100 creates an integrated workspace that organizes tools within the tool holder 122 with divided compartments 124. The adaptable workdesk 100 also provides appropriate lighting through multiple strips of LED lights 134*a*, 134*b*, 134*c*, 134*d* in the light bar 128, which is rotatable to be disposed at different angles, and the moveable light 148 which is detachable. The presence of a dial 131 on each rotation mechanism 130 of the light bar 128 allows for precise control of lighting angles, further enhancing the versatility of the workspace. This configuration aids significantly in the cleaning and efficient use of the workspace, tailored specifically to the needs of the industrial designer working from home.

The adaptable workdesk 100 provides a comprehensive and adaptable workspace that can accommodate various tasks, such as sketching, prototyping, computer-aided design (CAD), and product photography. The adaptable workdesk 100 embodies a multifunctional desk project that is ideal for various settings including home offices, coworking spaces, and educational institutions, especially in scenarios where remote work is prevalent. By addressing the specific needs of industrial design students and professionals, the adaptable workdesk 100 creates a conducive environment that mitigates the risk of injuries, reduces the likelihood of tool loss or damage, and saves on the costs associated with purchasing multiple pieces of equipment. This desk is designed to be a comprehensive solution that not only supports the technical aspects of design work but also contributes to a more organized and efficient workspace. The minimalist and functional design of the adaptable workdesk 100 ensures that the workspace remains clutter-free, thereby boosting productivity and enhancing the aesthetic appeal of the environment. This makes the adaptable workdesk 100 a practical, stylish, and essential asset for any designer or professional seeking a versatile workspace solution.

A first embodiment describes an adaptable workdesk 100, comprising a work surface 102 having a top side 104 and a bottom side 106, a front edge 108, a rear edge 110, a left edge 112, a right edge 114, a first axis 'X1' which extends from the rear edge 110 to the front edge 108 and bisects the top side 104 and a second axis 'X2' which extends from the left edge 112 to the right edge 114 is located about one third of a distance between the rear edge 110 and the front edge 108; an inset section 116 located on the top side 104 between the first axis 'X1' and the right edge 114 near the front edge 108 and between the second axis 'X2' and the front edge 108, wherein the inset section 116 is configured to receive a cutting mat; a flat work section 118 located on the top side 104 between the left edge 112 and the first axis 'X1' and between the second axis 'X2' and the front edge 108; a tool holder 122 located within a first recess 120 on the top side 104 between the rear edge 110 and the second axis 'X2' and between the left edge 112 and the right edge 114; a light bar 128 having a flattened U-shape, wherein the light bar 128 has a left end 128*a* and a right end 128*b*, wherein each of the left end 128*a* and the right end 128*b* are rotatably attached to the left edge 112 and the right edge 114 respectively by a rotation mechanism 130, wherein the rotation mechanism 130 is configured to rotate the light bar 128 at selectable angles with respect to the top side 104; a second recess 142 located in the top side 104 between the rear edge 110 and the tool holder 122, wherein the second recess 142 is configured to hold a roller 144 connected between the left edge 112 and the right edge 114; a moveable light 148; a U-shaped leg 176 having a first leg 176*a* attached to the left edge 112 near the front edge 108 and a second leg 176*b* attached to the left edge 112 near the rear edge 110; a support leg 178 attached to the right edge 114 near the rear edge 110; a support wall 180 slidably attached to the right edge 114 between the support leg 178 and the front edge 108, wherein the support wall 180 is configured to slide between a stowed position in which a front edge 182 of the support wall 180 is flush with the front edge 108 of the work surface 102 and a deployed position in which the front edge 182 of the support wall 180 extends outwardly from the front edge 108 of the work surface 102; and a side table 184 rotatably and detachably connected to the support wall 180.

In an aspect, the adaptable workdesk 100 further comprises a plurality of divided compartments 124 located within the tool holder 122; and a first hinge 126*a* connected within the first recess 120 to a first end 122*a* of the tool holder 122 and a second hinge 126*b* connected within the first recess 120 to a second end 122*b* of the tool holder 122, wherein the first hinge 126*a* and the second hinge 126*b* are configured to permit the tool holder 122 to rotate between one of an open position in which the plurality of divided compartments 124 are accessible and a closed position in which a top wall 122*c* of the tool holder 122 is flush with the work surface 102.

In an aspect, the adaptable workdesk 100 further comprises a photography backdrop sheet 146 connected to the roller 144, wherein the photography backdrop sheet 146 is configured to pull out of the second recess 142 and drape over the light bar 128 when the light bar 128 is deployed at an angle in a range of 45° to 90° with respect to the top side 104.

In an aspect, the adaptable workdesk 100 further comprises a pair of collapsible brackets 186 each including a mounting bracket 186*a* configured to connect to the support wall 180 near the bottom side 106 of the work surface 102, and a side table support bracket 186*b* hingeably connected to the mounting bracket 186*a* and a strut 187 having a first end 187*a* connected to the mounting bracket 186*a* and a second end 187*b* connected within a track 188 in the side table support bracket 186*b*, wherein the strut 187 is configured to slide within the track 188 to rotate the side table support brackets 186*b* between a first position in which the side table support brackets 186*b* are adjacent to the mounting brackets 186*a* when the support wall 180 is in the stowed position and a second position in which the side table support brackets 186*b* are perpendicular to the mounting brackets 186*a* when the support wall 180 is in the deployed position.

In an aspect, the side table 184 comprises a support frame 184*a* connected to the side table support brackets 186*b*; and a portable table 184*b* detachably held by the support frame 184*a*.

In an aspect, the adaptable workdesk 100 further comprises a set of collapsible legs 184*c*, wherein each collapsible leg 184*c* is attached by a hinge to an underside of the side table 184, wherein the set of collapsible legs 184*c* are configured to lie adjacent to the underside of the side table 184 when the support wall 180 is in the stowed position and to rotate to an open position when the support wall 180 is in the deployed position and the portable table 184*b* is detached from the support frame 184*a*.

In an aspect, the adaptable workdesk 100 further comprises a groove 190*a* located within an inner perimeter of the support frame 184*a*; and a portable table support panel 190*b* located beneath the support frame 184*a* and near an edge of the support frame 184*a* which is adjacent to the support wall 180, wherein the portable table support panel 190*b* includes a cutout 190*c* around the collapsible legs 184*c*.

In an aspect, the adaptable workdesk 100 further comprises an open slot 196*a* located between the left edge 112 and the flat work section 118, wherein the open slot 196*a* is configured to hold a fabric loop 196*b*.

In an aspect, the adaptable workdesk 100 further comprises a first strip of LED lights 134*a* located along an inside left leg 132*a* of the flattened U-shape of the light bar 128; a second strip of LED lights 134*b* located along an inside right leg 132*b* of the flattened U-shape of the light bar 128; a third strip of LED lights 134*c* located along an inside of a central section 132*c* of the flattened U-shape between the first strip of LED lights 134*a* and the second strip of LED lights 134*b*; and a fourth strip of LED lights 134*d* located along a back side of the central section 132*c*.

In an aspect, the left edge 112 and the right edge 114 are each indented from the rear edge 110 to about three quarters of the distance from the rear edge 110 to the front edge 108 to receive the inside left leg 132*a* and the inside right leg 132*b* of the light bar 128 when the light bar 128 is in a non-deployed position.

In an aspect, the adaptable workdesk 100 further comprises a light control panel 136 located near the front edge 108 between the inset section 116 and the right edge 114; a first switch 136*a* located in the light control panel 136, wherein the first switch 136*a* is connected to a source of electrical power; a second switch 136*b* located in the light control panel 136 adjacent to the first switch 136*a*, wherein the second switch 136*b* is connected to the first switch 136*a*, the first strip of LED lights 134*a* and the second strip of LED lights 134*b*; a third switch 136*c* located in the light control panel 136 adjacent to the second switch 136*b*, wherein the third switch 136*c* is connected to the first switch 136*a* and the third strip of LED lights 134*c*; and a fourth switch 136*d* located in the light control panel 136 adjacent to the third switch 136*c*, wherein the fourth switch 136*d* is connected to the first switch 136*a* and the fourth strip of LED lights 134*d*.

In an aspect, the adaptable workdesk 100 further comprises at least one power receptacle 138 located on the rear edge 110 of the top side 104 near the right edge 114; and a power cord 140 configured to connect the at least one power receptacle to the source of electrical power.

In an aspect, each rotation mechanism 130 comprises a first mounting bracket 130*a* configured to connect to an outer edge of a respective leg of the flattened U-shaped light bar 128; and a second mounting bracket 130*b* configured to connect to a respective right edge 114 or left edge 112 of the work surface 102.

In an aspect, the adaptable workdesk 100 further comprises a dial 131 located on each rotation mechanism 130 of the light bar 128, wherein the dial 131 includes markings which indicate an angular position of the light bar 128 with respect to the work surface 102.

In an aspect, the moveable light 148 comprises a stalk 152 including three sections, wherein a first section 154 has a first end 154*a* connected to a C-clamp 160, wherein the C-clamp 160 is configured to moveably attach the stalk 152 to a position on one of the left edge 112, the right edge 114, the rear edge 110 and the front edge 108; and a center section 156 of the stalk 152 connected at a first end 156*a* to a second end 154*b* of the first section 154 by a first ball joint 155; and a neck section 158 connected at a first end 158*a* to a second end 156*b* of the center section 156 by a second ball joint 157, wherein the neck section 158 includes a lighting recess 162.

In an aspect, the adaptable workdesk 100 further comprises a back cover 164 configured to cover a back side of the lighting recess 162 of the neck section 158; a rechargeable battery 166 located within the lighting recess 162 and connected to the back cover 164; at least one fluorescent light 168 located within the lighting recess 162, wherein the at least one fluorescent light 168 is electrically connected to the rechargeable battery 166; a front cover 170 comprising a diffuser configured to cover the fluorescent light 168 and spread light generated by the at least one fluorescent light 168; and an ON/OFF switch 172 located on the back cover 164.

In an aspect, the adaptable workdesk 100 further comprises a battery charger port 174 located in the back cover 164, wherein the battery charger port 174 is connected to the rechargeable battery 166.

In an aspect, the adaptable workdesk 100 further comprises a third recess 150 located in the top side 104 between the rear edge 110 and the tool holder 122, wherein the third recess 150 is configured to store the moveable light 148.

In an aspect, the adaptable workdesk 100 further comprises a set of swivel wheels 192 connected to a bottom edge 180*a* of the support wall 180, wherein the set of swivel wheels 192 are configured to rotate when the support wall 180 is moved between the stowed position and the deployed position.

In an aspect, the adaptable workdesk 100 further comprises a channel 194*a* located on the bottom side 106 of the work surface 102 near the right edge 114, wherein the channel 194*a* is configured to extend from the rear edge 110 to the front edge 108; a track 194*b* located in the channel 194*a*; and a T-shaped slide 194*c* attached to a top edge 180*b* of the support wall 180, wherein the T-shaped slide 194*c* is configured to slide within the track 194*b*.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An adaptable workdesk, comprising:

a work surface having a top side and a bottom side, a front edge, a rear edge, a left edge, a right edge, a first axis which extends from the rear edge to the front edge and bisects the top side and a second axis which extends from the left edge to the right edge is located about one third of a distance between the rear edge and the front edge;

an inset section located on the top side between the first axis and the right edge near the front edge and between the second axis and the front edge, wherein the inset section is configured to receive a cutting mat;

a flat work section located on the top side between the left edge and the first axis and between the second axis and the front edge;

a tool holder located within a first recess on the top side between the rear edge and the second axis and between the left edge and the right edge;

a light bar having a flattened U-shape, wherein the light bar has a left end and a right end, wherein each of the left end and the right end are rotatably attached to the left edge and the right edge respectively by a rotation mechanism, wherein the rotation mechanism is configured to rotate the light bar at selectable angles with respect to the top side;

a second recess located in the top side between the rear edge and the tool holder, wherein the second recess is configured to hold a roller connected between the left edge and the right edge;

a moveable light;

a U-shaped leg having a first leg attached to the left edge near the front edge and a second leg attached to the left edge near the rear edge;

a support leg attached to the right edge near the rear edge;

a support wall slidably attached to the right edge between the support leg and the front edge, wherein the support wall is configured to slide between a stowed position in which a front edge of the support wall is flush with the front edge of the work surface and a deployed position in which the front edge of the support wall extends outwardly from the front edge of the work surface; and a side table rotatably and detachably connected to the support wall.

2. The adaptable workdesk of claim 1, further comprising:

a plurality of divided compartments located within the tool holder; and a first hinge connected within the first recess to a first end of the tool holder and a second hinge connected within the first recess to a second end of the tool holder, wherein the first hinge and the second hinge are configured to permit the tool holder to rotate between one of an open position in which the plurality of divided compartments are accessible and a closed position in which a top wall of the tool holder is flush with the work surface.

3. The adaptable workdesk of claim 1, further comprising:

a photography backdrop sheet connected to the roller, wherein the photography backdrop sheet is configured to pull out of the second recess and drape over the light bar when the light bar is deployed at an angle in a range of 45° to 90° with respect to the top side.

4. The adaptable workdesk of claim 1, further comprising:

a pair of collapsible brackets each including:

a mounting bracket configured to connect to the support wall near the bottom side of the work surface, and a side table support bracket hingeably connected to the mounting bracket and a strut having a first end connected to the mounting bracket and a second end connected within a track in the side table support bracket, wherein the strut is configured to slide within the track to rotate the side table support brackets between a first position in which the side table support brackets are adjacent to the mounting bracket when the support wall is in the stowed position and a second position in which the side table support brackets are perpendicular to the mounting bracket when the support wall is in the deployed position.

5. The adaptable workdesk of claim 4, wherein the side table comprises:

a support frame connected to the side table support brackets; and a portable table detachably held by the support frame.

6. The adaptable workdesk of claim 5, further comprising:

a set of collapsible legs, wherein each collapsible leg is attached by a hinge to an underside of the side table, wherein the set of collapsible legs are configured to lie adjacent to the underside of the side table when the support wall is in the stowed position and to rotate to an open position when the support wall is in the deployed position and the portable table is detached from the support frame.

7. The adaptable workdesk of claim 6, further comprising:

a groove located within an inner perimeter of the support frame; and a portable table support panel located beneath the support frame and near an edge of the support frame which is adjacent to the support wall, wherein the portable table support panel includes a cutout around the collapsible legs.

8. The adaptable workdesk of claim 1, further comprising:

an open slot located between the left edge and the flat work section, wherein the open slot is configured to hold a fabric loop.

9. The adaptable workdesk of claim 1, further comprising:

a first strip of LED lights located along an inside left leg of the flattened U-shape of the light bar;

a second strip of LED lights located along an inside right leg of the flattened U-shape of the light bar;

a third strip of LED lights located along an inside of a central section of the flattened U-shape between the first strip of LED lights and the second strip of LED lights; and a fourth strip of LED lights located along a back side of the central section.

10. The adaptable workdesk of claim 9, wherein the left edge and the right edge are each indented from the rear edge to about three quarters of the distance from the rear edge to the front edge to receive the inside left leg and the inside right leg of the light bar when the light bar is in a non-deployed position.

11. The adaptable workdesk of claim 9, further comprising:

a light control panel located near the front edge between the inset section and the right edge;

a first switch located in the light control panel, wherein the first switch is connected to a source of electrical power;

a second switch located in the light control panel adjacent to the first switch, wherein the second switch is connected to the first switch, the first strip of LED lights and the second strip of LED lights;

a third switch located in the light control panel adjacent to the second switch, wherein the third switch is connected to the first switch and the third strip of LED lights; and a fourth switch located in the light control panel adjacent to the third switch, wherein the fourth switch is connected to the first switch and the fourth strip of LED lights.

12. The adaptable workdesk of claim 11, further comprising:

at least one power receptacle located on the rear edge of the top side near the right edge; and a power cord configured to connect the at least one power receptacle to the source of electrical power.

13. The adaptable workdesk of claim 1, wherein each rotation mechanism comprises:

a first mounting bracket configured to connect to an outer edge of a respective leg of the flattened U-shaped light bar; and a second mounting bracket configured to connect to a respective right edge or left edge of the work surface.

14. The adaptable workdesk of claim 1, further comprising:

a dial located on each rotation mechanism of the light bar, wherein the dial includes markings which indicate an angular position of the light bar with respect to the work surface.

15. The adaptable workdesk of claim 1, wherein the moveable light comprises:

a stalk including three sections, wherein:

a first section has a first end connected to a C-clamp, wherein the C-clamp is configured to moveably attach the stalk to a position on one of the left edge, the right edge, the rear edge and the front edge; and a center section of the stalk connected at a first end to a second end of the first section by a first ball joint; and a neck section connected at a first end to a second end of the center section by a second ball joint, wherein the neck section includes a lighting recess.

16. The adaptable workdesk of claim 15, further comprising:

a back cover configured to cover a back side of the lighting recess of the neck section;

a rechargeable battery located within the lighting recess and connected to the back cover;

at least one fluorescent light located within the lighting recess, wherein the at least one fluorescent light is electrically connected to the rechargeable battery;

a front cover comprising a diffuser configured to cover the fluorescent light and spread light generated by the at least one fluorescent light; and an ON/OFF switch located on the back cover.

17. The adaptable workdesk of claim 16, further comprising:

a battery charger port located in the back cover, wherein the battery charger port is connected to the rechargeable battery.

18. The adaptable workdesk of claim 1, further comprising:

a third recess located in the top side between the rear edge and the tool holder, wherein the third recess is configured to store the moveable light.

19. The adaptable workdesk of claim 1, further comprising:

a set of swivel wheels connected to a bottom edge of the support wall, wherein the set of swivel wheels are configured to rotate when the support wall is moved between the stowed position and the deployed position.

20. The adaptable workdesk of claim 1, further comprising:

a channel located on the bottom side of the work surface near the right edge, wherein the channel is configured to extend from the rear edge to the front edge;

a track located in the channel; and a T-shaped slide attached to a top edge of the support wall, wherein the T-shaped slide is configured to slide within the track.

* * * * *